(12) United States Patent
Shibata

(10) Patent No.: US 9,237,008 B2
(45) Date of Patent: Jan. 12, 2016

(54) ENCRYPTION DEVICE, ENCRYPTION METHOD, AND ENCRYPTION PROGRAM

(75) Inventor: Yoichi Shibata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/118,954

(22) PCT Filed: Jul. 25, 2011

(86) PCT No.: PCT/JP2011/066798
§ 371 (c)(1),
(2), (4) Date: Nov. 20, 2013

(87) PCT Pub. No.: WO2013/014734
PCT Pub. Date: Jan. 31, 2013

(65) Prior Publication Data
US 2014/0086412 A1    Mar. 27, 2014

(51) Int. Cl.
*H04K 1/00*    (2006.01)
*H04L 9/08*    (2006.01)
*H04L 9/06*    (2006.01)
*H04L 9/16*    (2006.01)
(Continued)

(52) U.S. Cl.
CPC ............ *H04L 9/0819* (2013.01); *H04L 9/0656* (2013.01); *H04L 9/0852* (2013.01); *H04L 9/0863* (2013.01); *H04L 9/16* (2013.01); *G10L 19/22* (2013.01); *G10L 19/24* (2013.01)

(58) Field of Classification Search
CPC .. H04L 9/0656; H04L 9/0863; H04L 2209/34
USPC ........................................................ 380/255
See application file for complete search history.

(56) References Cited

U.S. PATENT DOCUMENTS 6,330,533 B2 * 12/2001 Su et al. ......................... 704/220
7,054,911 B1 * 5/2006 Lango et al. .................. 709/213
(Continued)

FOREIGN PATENT DOCUMENTS

CN    1849813 A    10/2006
EP    1 724 933    11/2006
(Continued)

OTHER PUBLICATIONS

International Search Report issued Aug. 23, 2011, in PCT/JP11/066798 filed Jul. 25, 2011.
(Continued)

*Primary Examiner* — Teshome Hailu
(74) *Attorney, Agent, or Firm* — Oblon, McClelland, Maier & Neustadt, L.L.P.

(57) ABSTRACT

An encryption device that, when voice or image data or the like being encoded is encrypted using a one-time pad (OTP) cipher and then transmitted, reduces a period of time in which a cipher key for the OTP cipher runs out. A first terminal device determines whether to encode transmission data by a first encoding scheme or a second encoding scheme having a lower bit rate than the first encoding scheme, depending on the number of remaining bits of an OTP cipher key, and encodes the transmission data according to the determined encoding scheme, thereby generating encoded data. The first terminal device encrypts the generated encoded data with the OTP cipher using the OTP cipher key, thereby generating encrypted communication data, and transmits the generated encrypted communication data to a second terminal device.

14 Claims, 30 Drawing Sheets

(51) Int. Cl.
  *G10L 19/22* (2013.01)
  *G10L 19/24* (2013.01)

(56) References Cited

U.S. PATENT DOCUMENTS

| 8,160,243 | B1* | 4/2012 | Bean ............................ 380/28 |
| 2001/0023395 | A1* | 9/2001 | Su et al. ...................... 704/220 |
| 2003/0068040 | A1 | 4/2003 | Wee et al. |
| 2003/0068041 | A1 | 4/2003 | Wee et al. |
| 2007/0076877 | A1 | 4/2007 | Camp, Jr. et al. |
| 2007/0250717 | A1 | 10/2007 | Kumagai et al. |
| 2008/0037622 | A1* | 2/2008 | Kohyama ..................... 375/232 |
| 2008/0175392 | A1 | 7/2008 | Ogura et al. |
| 2009/0316910 | A1 | 12/2009 | Maeda et al. |
| 2010/0290627 | A1 | 11/2010 | Tsuji et al. |
| 2011/0194687 | A1* | 8/2011 | Brothers ........................ 380/44 |
| 2012/0141039 | A1* | 6/2012 | Yang et al. .................... 382/233 |
| 2013/0142328 | A1 | 6/2013 | Shibata et al. |

FOREIGN PATENT DOCUMENTS

| JP | 5 14339 | 1/1993 |
| JP | 2002 33987 | 1/2002 |
| JP | 2003 153228 | 5/2003 |
| JP | 2005 528631 | 9/2005 |
| JP | 2005 531938 | 10/2005 |
| JP | 2007 20151 | 1/2007 |
| JP | 2007 151048 | 6/2007 |
| JP | 2007 258850 | 10/2007 |
| JP | 2007 288747 | 11/2007 |
| JP | 2008-172647 A | 7/2008 |
| JP | 2008 306633 | 12/2008 |
| JP | 2009 27642 | 2/2009 |
| JP | 2009 510902 | 3/2009 |
| JP | 2009-246457 A | 10/2009 |
| JP | 2011-44768 A | 3/2011 |

OTHER PUBLICATIONS

Japanese Office Action issued Dec. 24, 2013 in Patent Application No. 2013-525461 with Partial English Translation.

Extended European Search Report issued Apr. 23, 2015 in Patent Application No. 11869972.7.

Office Action issued Aug. 13, 2015 in Chinese Patent Application No. 201180071063.0 (with English translation).

* cited by examiner

Fig. 26

| ITEMS TO BE EVALUATED | | VALUE OF ITEM (EXAMPLE) | SIGNIFICANCE LEVEL |
|---|---|---|---|
| VOICE QUALITY | VOICE VOLUME | LARGE | LOW |
| | | SMALL | HIGH |
| | INTONATION CHANGE | LARGE | HIGH |
| | | SMALL | LOW |
| COMMUNICATION STATE | OTHER SIDE OF COMMUNICATION | STRANGER | LOW |
| | | COLLEAGUE, FRIEND | AVERAGE |
| | | BUSINESS ACQUAINTANCE, SUPERVISOR | HIGH |
| | COMMUNICATION RECORD | RECENT RECORD | HIGH |
| | | NO RECENT RECORD | LOW |

US 9,237,008 B2

ENCRYPTION DEVICE, ENCRYPTION METHOD, AND ENCRYPTION PROGRAM

TECHNICAL FIELD

The present invention relates to a technique of transmitting data that is encrypted using a one-time pad cipher.

BACKGROUND ART

The one-time pad cipher is a common key cryptosystem with which a key is shared between the transmission side and the reception side. With the one-time pad cipher, encryption is carried out using a cipher key of the same amount (the same bit count) as that of communication data. With the one-time pad cipher, a cipher key is used only once and will not be reused.

A typical example of the one-time pad cipher includes a Vernam cipher, with which bitwise exclusive OR of communication data and a cipher key is calculated and the calculated result is treated as encrypted data.

Cipher communication by means of a one-time pad cipher requires a cipher key of a large amount because it consumes the same amount of the cipher key as that of the communication data. With the one-time pad cipher, once the cipher key is exhausted, cipher communication can no longer be performed.

Patent Literature 1 includes a description on the choice of a cryptosystem to apply between a one-time pad cipher and a block cipher depending on the significance of the communication data to be encrypted. This reduces the consumption of the cipher key in the one-time pad cipher.

Patent Literature 2 includes a description on how the accumulated amount of the cipher key of each terminal device is monitored so that a cipher key is generated with a higher priority for a terminal device having a small accumulated amount. This is aimed at prevention of the exhaustion of the cipher key in a particular terminal device.

Citation List

Patent Literature

Patent Literature 1: JP 2007-258850 A
Patent Literature 2: JP 2008-306633 A

DISCLOSURE OF INVENTION

Technical Problem

The method described in Patent Literature 1 suppresses consumption of the cipher key for the one-time pad cipher by choosing a cryptosystem to apply depending on the significance of the communication data. Even with the method described in Patent Literature 1, however, there may be a case where the cipher key for the one-time pad cipher runs out and cipher communication cannot be performed.

The significance of the communication data is a subjective criterion. The user or the administrator must determine, at the start of or before communication, the significance of the communication data to be encrypted. For this reason, the user must determine the significance after the communication data is input and before the communication data is encrypted, and the entire process concerning cipher communication cannot be automated.

Furthermore, depending on the type of the communication data, the significance cannot be determined in advance, as in a case where a voice communication includes a significant conversation. Therefore, it is not universally effective to switch the cryptosystem based on the significance of the communication data to be encrypted.

According to the method described in Patent Literature 2, if the terminal device is, for example, a mobile terminal which is not capable of continuous communication, it may be impossible to supplement the lack of the cipher key. Hence, a case may arise where cipher communication cannot be performed.

It is an object of the present invention, when voice or image data or the like being encoded is encrypted by a one-time pad cipher and then transmitted, to reduce a period of time in which a cipher key for the one-time pad cipher runs out, so that one-time pad cipher communication can be continued for a longer period of time.

Solution to Problem

An encryption device according to the present invention includes
a cipher key storage part that stores a cipher key composed of a plurality of bits and used in a one-time pad cipher;
a scheme determination part that determines an encoding scheme with which transmission data is to be encoded from a first encoding scheme and a second encoding scheme having a lower bit rate than the first encoding scheme, depending on a number of remaining bits of the cipher key stored by the cipher key storage part;
an encoding part that encodes the transmission data according to the encoding scheme determined by the scheme determination part, thereby generating encoded data; and
an encryption part that encrypts with the one-time pad cipher using the cipher key stored in the cipher key storage part the encoded data generated by the encoding part, thereby generating encrypted data.

Advantageous Effects of Invention

An encryption device according to the present invention changes an encoding scheme depending on the number of remaining bits of a cipher key. With this arrangement, it is possible to control the amount of the cipher key to be used depending on the number of the remaining bits of the OTP cipher key. Thus, a period of time in which the cipher key for a one-time pad cipher runs out can be reduced, so that one-time pad cipher communication can be continued for a longer period of time.

BRIEF DESCRIPTION OF DRAWINGS

[FIG. 26] is a diagram showing a specific example of how a significance level is determined;

DESCRIPTION OF PREFERRED EMBODIMENTS

Embodiments of the present invention will be described with reference to the drawings.

In the following description, a processing device is a CPU 924 to be described later, or the like. A storage device is a ROM 926, a RAM 927, a magnetic disk 930 to be described later, or the like. That is, the processing device and the storage device are hardware.

Embodiment 1

Embodiment 1 will describe a technique with which, when the remaining amount (the number of remaining bits) of a cipher key for a one-time pad cipher (hereinafter, an OTP cipher key) falls below a predetermined threshold value, a scheme for encoding voice or the like is switched to a scheme that produces a smaller amount of data as a result of encoding voice or the like per unit time (a scheme having a lower bit rate). With this arrangement, the amount of the OTP cipher key consumed per unit time can be reduced, so that a period of time until the OTP cipher key is exhausted can be extended. Therefore, OTP cipher communication can be continued for a longer period of time.

Generally, when an encoding scheme having a higher bit rate is employed, higher audio or image quality is obtained. Thus, when there is a sufficient amount of the OTP cipher key, it is desirable to employ the encoding scheme having the higher bit rate.

In Embodiment 1, the encoding scheme is chosen depending on the remaining amount of the OTP cipher key. The remaining amount of the OTP cipher key is information that a device can learn easily. Therefore, by switching the encoding scheme based on the remaining amount of the OTP cipher key, it is possible to realize a system that automatically switches the encoding scheme without requiring a user of the device to perform an operation for switching the encoding scheme.

Figure 1:
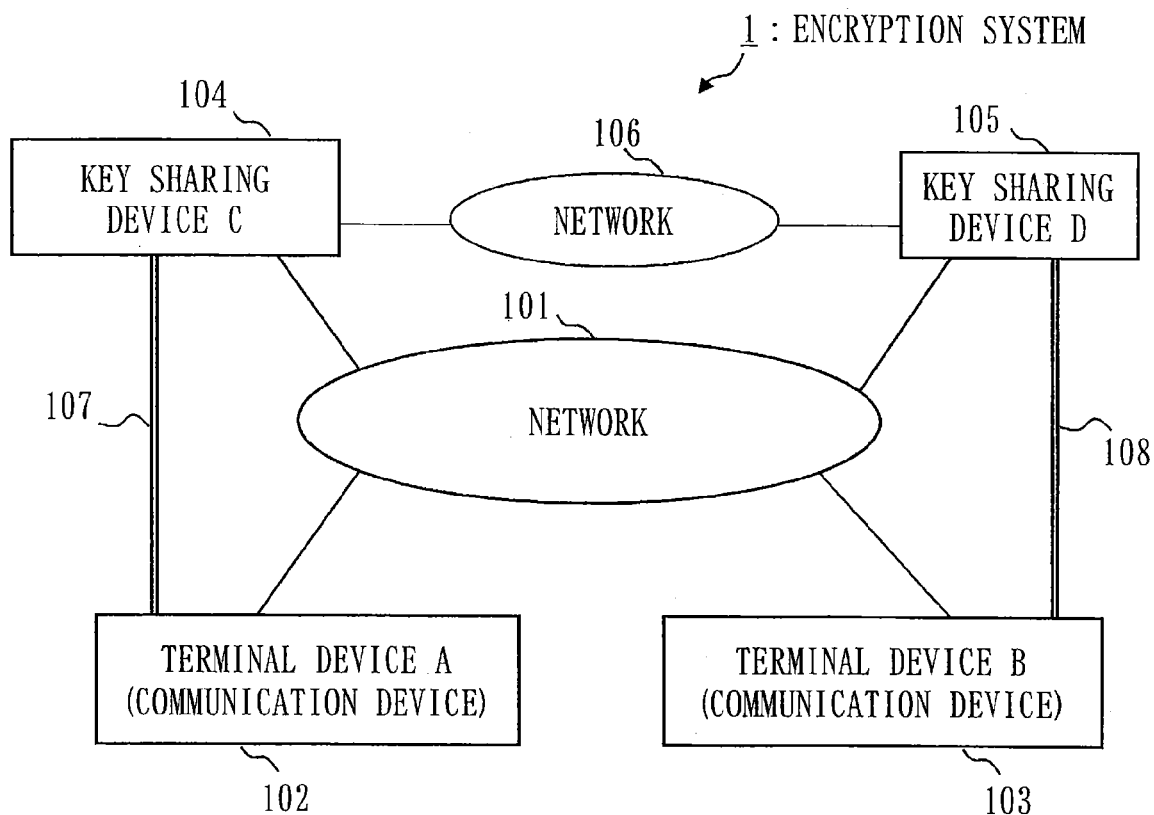
[FIG. 1] is a schematic diagram of an encryption system 1 to which a communication scheme according to Embodiment 1 can be applied.

FIG. 1 is a schematic diagram of an encryption system 1 to which a communication scheme according to Embodiment 1 can be applied.

A network 101 such as the Internet is connected to a terminal device A 102 and a terminal device B 103. A key sharing device C 104 and a key sharing device D 105 are connected to the network 101, or a network 106 which is not connected to the network 101 physically or logically. Furthermore, the terminal device A 102 and the key sharing device C 104 are connected to each other via a communication cable 107 such as a USB (Universal Serial Bus). Similarly, the terminal device B 103 and the key sharing device D 105 are connected to each other via a communication cable 108.

An example will be described hereinafter where cipher communication takes place between the terminal device A 102 and the terminal device B 103 using an OTP cipher key shared by the key sharing device C 104 and the key sharing device D 105.

Note that each of the terminal device A 102 and the terminal device B 103 is a transmission-side communication device (encryption device) which transmits encrypted data, and at the same time a reception-side communication device (decryption device) which receives encrypted data. In the following description, the terminal device A 102 is an example of the transmission-side communication device and the terminal device B 103 is an example of the reception-side communication device.

Also, note that the terminal device A 102 obtains the OTP cipher key from the key sharing device C 104, and that the terminal device B 103 obtains the OTP cipher key from the key sharing device D 105.

First, a method with which the key sharing devices share the OTP cipher key will be described.

Figure 2:
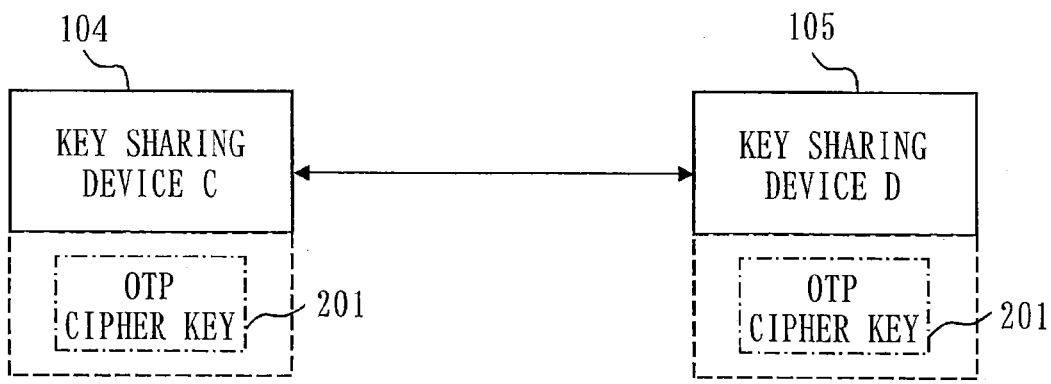
[FIG. 2] is a diagram briefly showing the operation of a case where a key sharing device C 104 and a key sharing device D 105 share an OTP cipher key via a network 101, or a network 106 which is not connected to the network 101 physically or logically.

FIG. 2 is a diagram briefly showing the operation of a case where the key sharing device C 104 and the key sharing device D 105 share the OTP cipher key via the network 101, or the network 106 which is not connected to the network 101 physically or logically.

The key sharing device C 104 and the key sharing device D 105 share an OTP cipher key 201 in accordance with a pre-determined method (key sharing algorithm) via the network 101 or the network 106. Any method may be employed for sharing the OTP cipher key 201. For example, the key sharing device C 104 and the key sharing device D 105 may be connected to each other via a physically or logically secure communication path, and may share the OTP cipher key 201. In Embodiment 1, assume that the key is shared using quantum cipher communication, as an example.

The operation of a case will now be briefly described where the terminal device obtains the OTP cipher key from the key sharing device.

Figure 3:
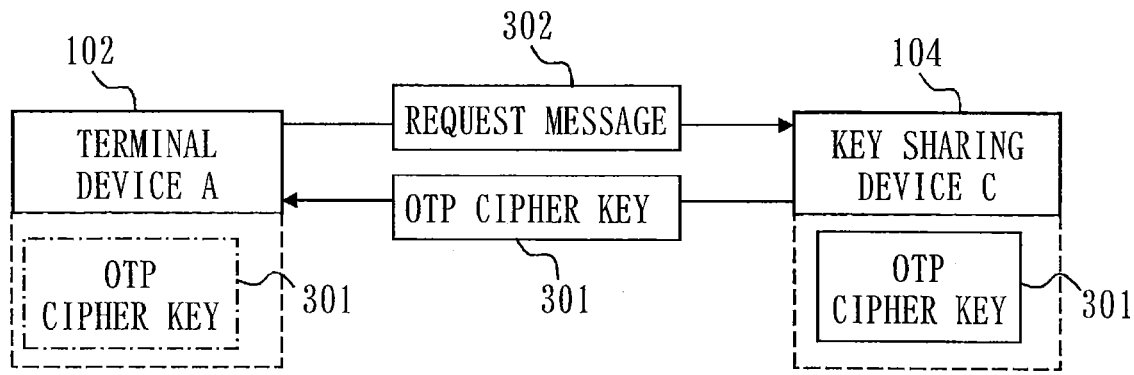
[FIG. 3] is a diagram briefly showing the operation of a case where a terminal device A 102 obtains an OTP cipher key 301 from the key sharing device C 104 via a communication cable 107.

FIG. 3 is a diagram briefly showing the operation of a case where the terminal device A 102 obtains an OTP cipher key 301 from the key sharing device C 104 via the communication cable 107.

First, the terminal device A 102 transmits an OTP cipher key request message 302 to the key sharing device C 104. After receiving the OTP cipher key request message 302, the key sharing device C 104 transmits the OTP cipher key 301 it holds to the terminal device A 102. Upon receiving the OTP cipher key 301, the terminal device A 102 stores the OTP cipher key 301 in the storage device.

Note that the terminal device B 103 obtains the OTP cipher key from the key sharing device D 105 via the communication cable 108 in the same manner.

The operation of a case will now be described where the terminal device A 102 and the terminal device B 103 start cipher communication using the OTP cipher, and switch to an encoding scheme having a lower bit rate at the point when the remaining amount of the cipher key for the OTP cipher falls below a predetermined threshold value.

Figure 4:
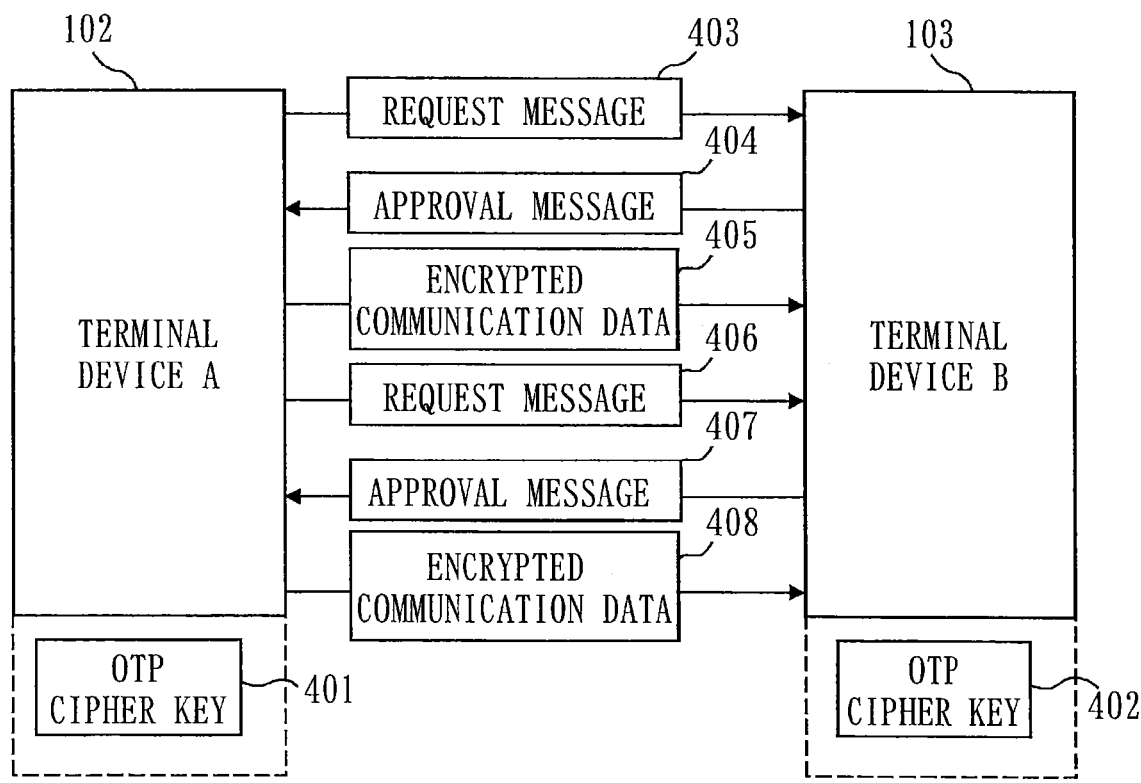
[FIG. 4] is a diagram briefly showing the operation of a case where the terminal device A 102 and the terminal device B 103 start cipher communication using an OTP cipher and switch to an encoding scheme having a lower bit rate at the point when the remaining amount of a cipher key for the OTP cipher falls below a predetermined threshold value.

FIG. 4 is a diagram briefly showing the operation of the case where the terminal device A 102 and the terminal device B 103 start cipher communication using the OTP cipher, and switch to the encoding scheme having the lower bit rate at the point when the remaining amount of the cipher key for the OTP cipher falls below the predetermined threshold value.

As a preparation for cipher communication, the terminal device A 102 holds a cipher key 401 for the OTP cipher, and the terminal device B 103 holds an OTP cipher key 402. The OTP cipher key 401 held by the terminal device A 102 and the OTP cipher key 402 held by the terminal device B 103 are obtained from the key sharing device C 104 and the key sharing device D 105, respectively, using the method described above. In Embodiment 1, it is assumed that the OTP cipher key 401 and the OTP cipher key 402 are the same.

Each of the terminal device A 102 and the terminal device B 103 can encode voice or image data according to an encoding scheme A (first encoding scheme) and an encoding scheme B (second encoding scheme). The encoding scheme A has a higher bit rate than the encoding scheme B and provides higher quality.

First, the terminal device A 102 checks the remaining amount of the OTP cipher key 401 it holds. It is assumed herein that the remaining amount of the OTP cipher key 401 is sufficient. Based on the remaining amount of the OTP cipher key 401, the terminal device A 102 calculates the data communication amount that can be handled with the OTP cipher. Then, the terminal device A 102 transmits to the terminal device B 103 a communication request message 403 indicating that the encoding scheme A is to be employed as the encoding scheme.

Upon receiving the communication request message 403, the terminal device B 103 checks the remaining amount of the OTP cipher key 402 it holds. It is assumed herein that the remaining amount of the OTP cipher key 402 is the same as that of the OTP cipher key 401. Based on the remaining amount of the OTP cipher key 402, the terminal device B 103 calculates the data communication amount that can be handled with the OTP cipher. Then, the terminal device B 103 transmits a communication approval message 404 to the terminal device A 102.

Upon receiving the communication approval message 404, the terminal device A 102 encodes voice or image data to be transmitted (transmission data) according to the encoding scheme A to generate communication data (encoded data). Using the OTP cipher key 401, the terminal device A 102 encrypts the communication data with the OTP cipher to generate encrypted communication data 405 (encrypted data). Then, the terminal device A 102 transmits the generated encrypted communication data 405 to the terminal device B 103.

Upon receiving the encrypted communication data 405, the terminal device B 103 decrypts the encrypted communication data 405 with the OTP cipher key 402 to obtain the communication data. The terminal device B 103 decodes the communication data according to the encoding scheme A to obtain the voice or image data. Since the OTP cipher key 401 and the OTP cipher key 402 are the same, the encrypted communication data 405 encrypted with the OTP cipher key 401 can be decrypted with the OTP cipher key 402.

When the encrypted communication data 405 is generated in the terminal device A 102, if the OTP cipher key falls below the predetermined threshold value, the terminal device A 102 transmits a switching request message 406 to the terminal device B 103.

Upon receiving the switching request message 406, the terminal device B 103 transmits a switching approval message 407 to the terminal device A 102.

Upon receiving the switching approval message 407, the terminal device A 102 encodes voice or image data according to the encoding scheme B to generate communication data. Using the OTP cipher key 401, the terminal device A 102 encrypts the communication data with the OTP cipher to generate encrypted communication data 408. Then, the terminal device A 102 transmits the generated encrypted communication data 408 to the terminal device B 103.

Upon receiving the encrypted communication data 408, the terminal device B 103 decrypts the encrypted communication data 408 with the OTP cipher key 402 to obtain the communication data. The terminal device B 103 decodes the communication data according to the encoding scheme B to obtain the voice or image data.

Figure 5:
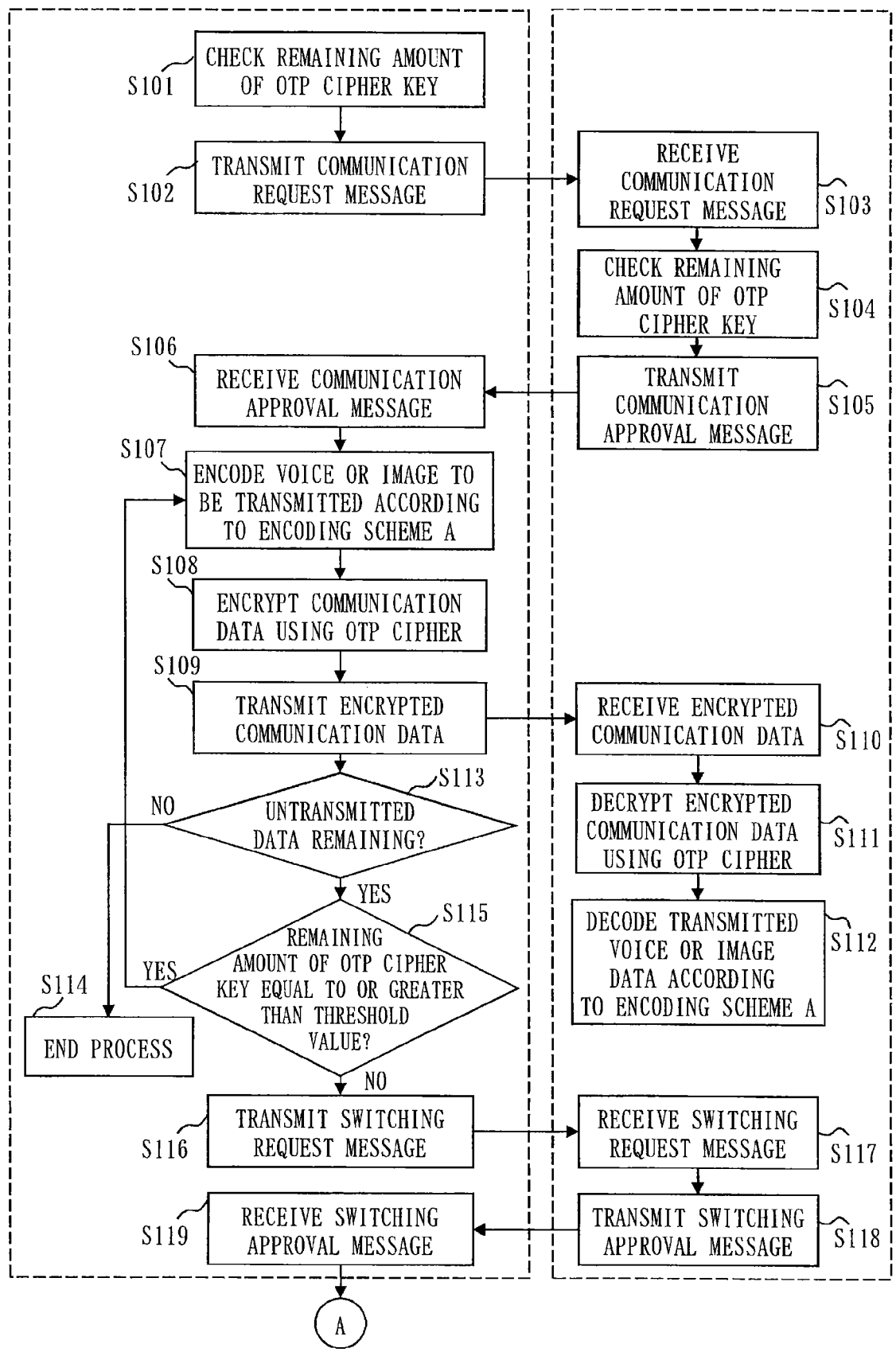
[FIG. 5] is a flowchart showing the flow of the communication process of FIG. 4 in Embodiment 1.
Figure 6:
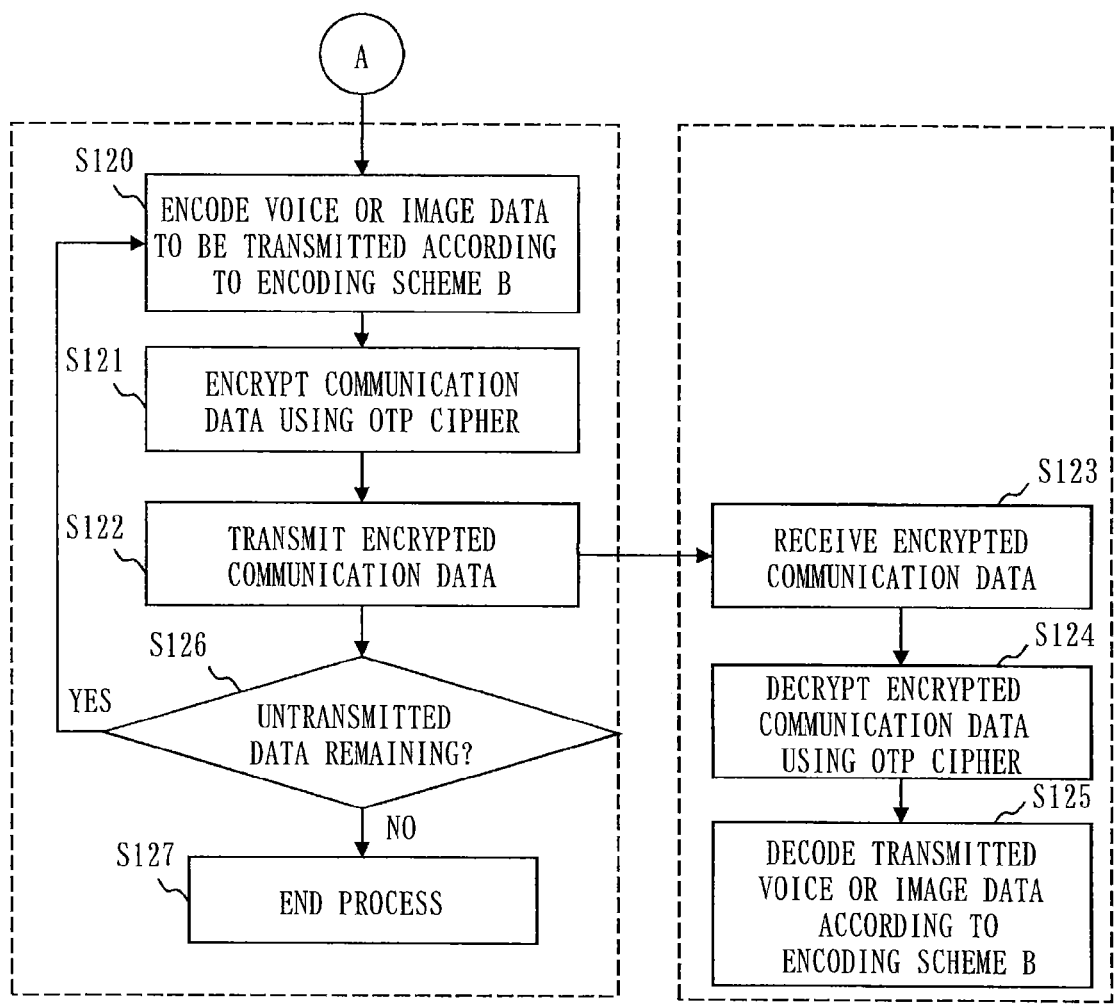
[FIG. 6] is a flowchart showing the flow of the communication process of FIG. 4 in Embodiment 1.

The communication process of FIG. 4 will now be described in detail. FIGS. 5 and 6 are flowcharts showing the flow of the communication process of FIG. 4 in Embodiment 1.

The terminal device A 102 checks the remaining amount of the OTP cipher key 401 it holds (S101). Then, the terminal device A 102 transmits to the terminal device B 103 the communication request message 403 indicating that the encoding scheme A is to be employed as the encoding scheme (S102).

The terminal device B 103 receives the communication request message 403 from the terminal device A 102 (S103). The terminal device B 103 checks the amount of the OTP cipher key 402 it holds (S104). Then, the terminal device B 103 transmits the communication approval message 404 to the terminal device A 102 (S105).

The terminal device A 102 receives the communication approval message 404 from the terminal device B 103 (S106). The terminal device A 102 encodes a unit data amount of the voice or image data to be transmitted according to the encoding scheme A to generate the communication data (S107). Note that the unit data amount of data means data of a predetermined number of bits, or data of a predetermined unit such as data of one file, for example. When voice call data in a cellular phone is encoded, for example, the unit data amount of data is voice call data per short-duration period, namely approximately 10 to 20 milliseconds. The terminal device A 102 encrypts the communication data with the OTP cipher key 401 to generate the encrypted communication data 405 (S108). Then, the terminal device A 102 transmits the encrypted communication data 405 to the terminal device B 103 (S109).

The terminal device B 103 receives the encrypted communication data 405 from the terminal device A 102 (S110). The terminal device B 103 decrypts the encrypted communication data 405 with the OTP cipher key 402 to obtain the communication data (S111). The terminal device B 103 decodes the communication data according to the encoding scheme A to obtain the voice or image data (S112).

Following S109, the terminal device A 102 checks whether there is untransmitted voice or image data (S113). If there is no untransmitted voice or image data (NO in S113), the terminal device A 102 ends the process (S114). On the other hand, if there is untransmitted voice or image data (YES in S113), the terminal device A 102 advances to the process of S115.

The terminal device A 102 checks whether the remaining amount of the OTP cipher key 401 is equal to or greater than the predetermined threshold value (S115). If the remaining amount of the OTP cipher key 401 is equal to or greater than the predetermined threshold value (YES in S115), the terminal device A 102 returns to the process of S107. On the other hand, if the remaining amount of the OTP cipher key 401 is less than the predetermined threshold value (NO in S115), the terminal device A 102 transmits the switching request message 406 to the terminal device B 103 (S116).

The terminal device B 103 receives the switching request message 406 (S117). The terminal device B 103 transmits the switching approval message 407 to the terminal device A 102 (S118).

The terminal device A 102 receives the switching approval message 407 (S119). The terminal device A 102 encodes the unit data amount of the voice or image data to be transmitted according to the encoding scheme B to generate the communication data (S120). The terminal device A 102 encrypts the communication data with the OTP cipher key 401 to generate the encrypted communication data 408 (S121). Then, the terminal device A 102 transmits the encrypted communication data 408 to the terminal device B 103 (S122).

The terminal device B 103 receives the encrypted communication data 408 (S123). The terminal device B 103 decrypts the encrypted communication data 408 with the OTP cipher key 402 to obtain the communication data (S124). The terminal device B 103 decodes the communication data according to the encoding scheme B to obtain the voice or image data (S125).

Following S122, the terminal device A 102 checks whether there is untransmitted voice or image data (S126). If there is no untransmitted voice or image data (NO in S126), the terminal device A 102 ends the process (S127). On the other hand, if there is untransmitted voice or image data (YES in S126), the terminal device A 102 returns to the process of S120.

The operation of a case will now be briefly described where the remaining amount of the OTP cipher key is less than the predetermined threshold value at the start of communication, and a sufficient amount of cipher communication cannot be performed with encoding according to the encoding scheme A. In this case, cipher communication is started from the beginning with encoding according to the encoding scheme B having the lower bit rate.

Figure 7:
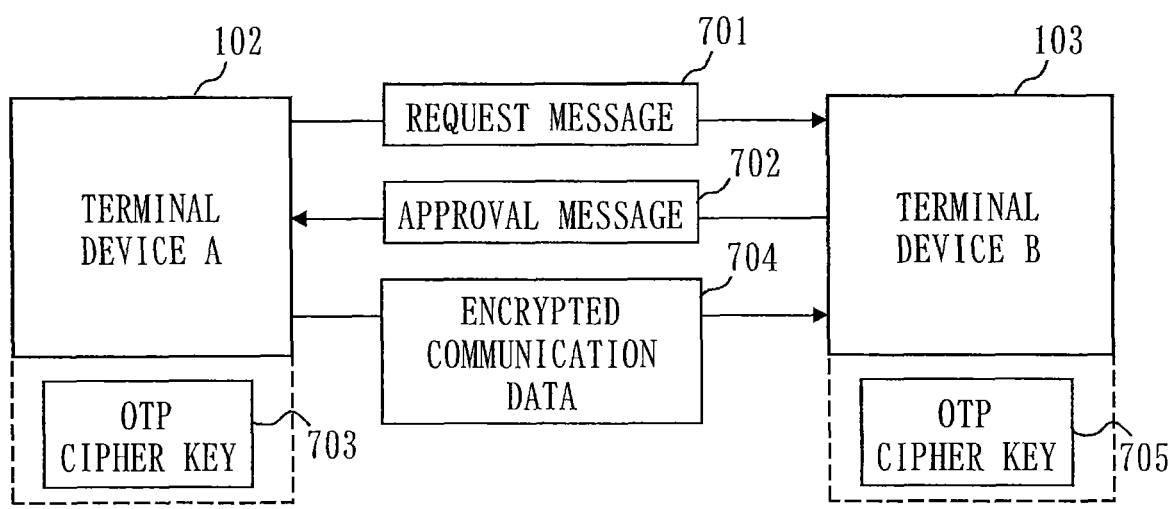
[FIG. 7] is a diagram briefly showing the operation of a case where the remaining amount of the OTP cipher key is less than the predetermined threshold value when the terminal device A 102 and the terminal device B 103 start cipher communication, and thus the cipher communication is started with encoding according to an encoding scheme B.

FIG. 7 is a diagram briefly showing the operation of a case where the remaining amount of the OTP cipher key is less than the predetermined threshold value when the terminal device A 102 and the terminal device B 103 start cipher communication, and thus cipher communication is started with encoding according to the encoding scheme B.

The terminal device A 102 holds an OTP cipher key 703, and the terminal device B 103 holds an OTP cipher key 705. It is assumed that the OTP cipher key 703 held by the terminal device A 102 and the OTP cipher key 705 held by the terminal device B 103 are the same.

First, the terminal device A 102 checks the amount of the OTP cipher key 703 it holds. It is assumed herein that the amount of the OTP cipher key is less than the predetermined threshold value. Accordingly, the terminal device A 102 transmits to the terminal device B 103 a communication request message 701 indicating that the encoding scheme B is to be employed as the encoding scheme.

Upon receiving the communication request message 701, the terminal device B 103 confirms from the message that the encoding scheme B is to be employed as the encoding scheme, and transmits a communication approval message 702 to the terminal device A 102.

Upon receiving the communication approval message 702, the terminal device A 102 encodes voice or image data to be transmitted according to the encoding scheme B to generate communication data. Using the OTP cipher key 703, the terminal device A 102 encrypts the communication data with the OTP cipher to generate encrypted communication data 704. Then, the terminal device A 102 transmits the generated encrypted communication data 704 to the terminal device B 103.

Upon receiving the encrypted communication data 704, the terminal device B 103 decrypts the encrypted communication data 704 with the OTP cipher key 705 to obtain the communication data. The terminal device B 103 decodes the communication data according to the encoding scheme B to obtain the voice or image data. Since the OTP cipher key 703 and the OTP cipher key 705 are the same, the encrypted communication data 704 encrypted with the OTP cipher key 703 can be decrypted with the OTP cipher key 705.

Figure 8:
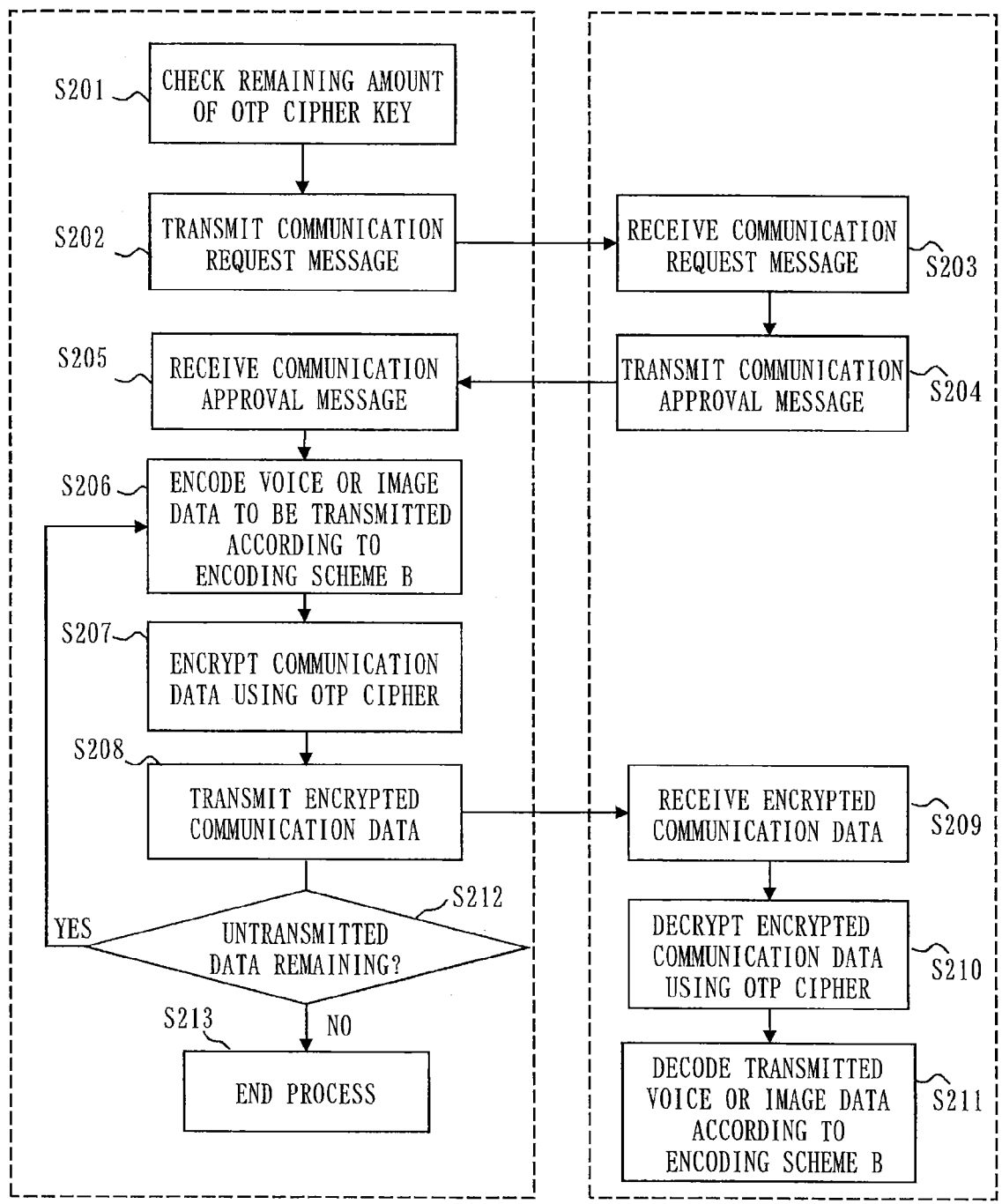
[FIG. 8] is a flowchart showing the flow of the communication process in FIG. 7 in Embodiment 1.

The communication process of FIG. 7 will now be described in detail. FIG. 8 is a flowchart showing the flow of the communication process of FIG. 7 in Embodiment 1.

The terminal device A 102 checks the amount of the OTP cipher key 703 it holds, and learns that the remaining amount of the OTP cipher key 703 is less than the predetermined threshold value (S201). Then, the terminal device A 102 transmits to the terminal device B 103 the communication request message 701 indicating that the encoding scheme B is to be employed as the encoding scheme (S202).

The terminal device B 103 receives the communication request message 701 from the terminal device A 102, and confirms from the message that the encoding scheme B is to be employed as the encoding scheme (S203). Then, the terminal device B 103 transmits the communication approval message 702 to the terminal device A 102 (S204).

The terminal device A 102 receives the communication approval message 702 from the terminal device B 103 (S205). The terminal device A 102 encodes the unit data amount of the voice or image data to be transmitted according to the encoding scheme B to generate the communication data (S206), and encrypts the communication data with the OTP cipher key 703 to generate the encrypted communication data 704 (S207). Then, the terminal device A 102 transmits the encrypted communication data 704 to the terminal device B 103 (S208).

The terminal device B 103 receives the encrypted communication data 704 (S209). The terminal device B 103 decrypts the encrypted communication data 704 with the OTP cipher key 705 to obtain the communication data (S210). The terminal device B 103 decodes the communication data according to the encoding scheme B to obtain the voice or image data (S211).

Following S208, the terminal device A 102 checks whether there is untransmitted voice or image data (S212). If there is no untransmitted voice or image data (NO in S212), the terminal device A 102 ends the process (S213). On the other hand, if there is untransmitted voice or image data (YES in S212), the terminal device A 102 returns to the process of S206.

The functions of the terminal device A 102 and the terminal device B 103 in Embodiment 1 will now be described.

Figure 9:
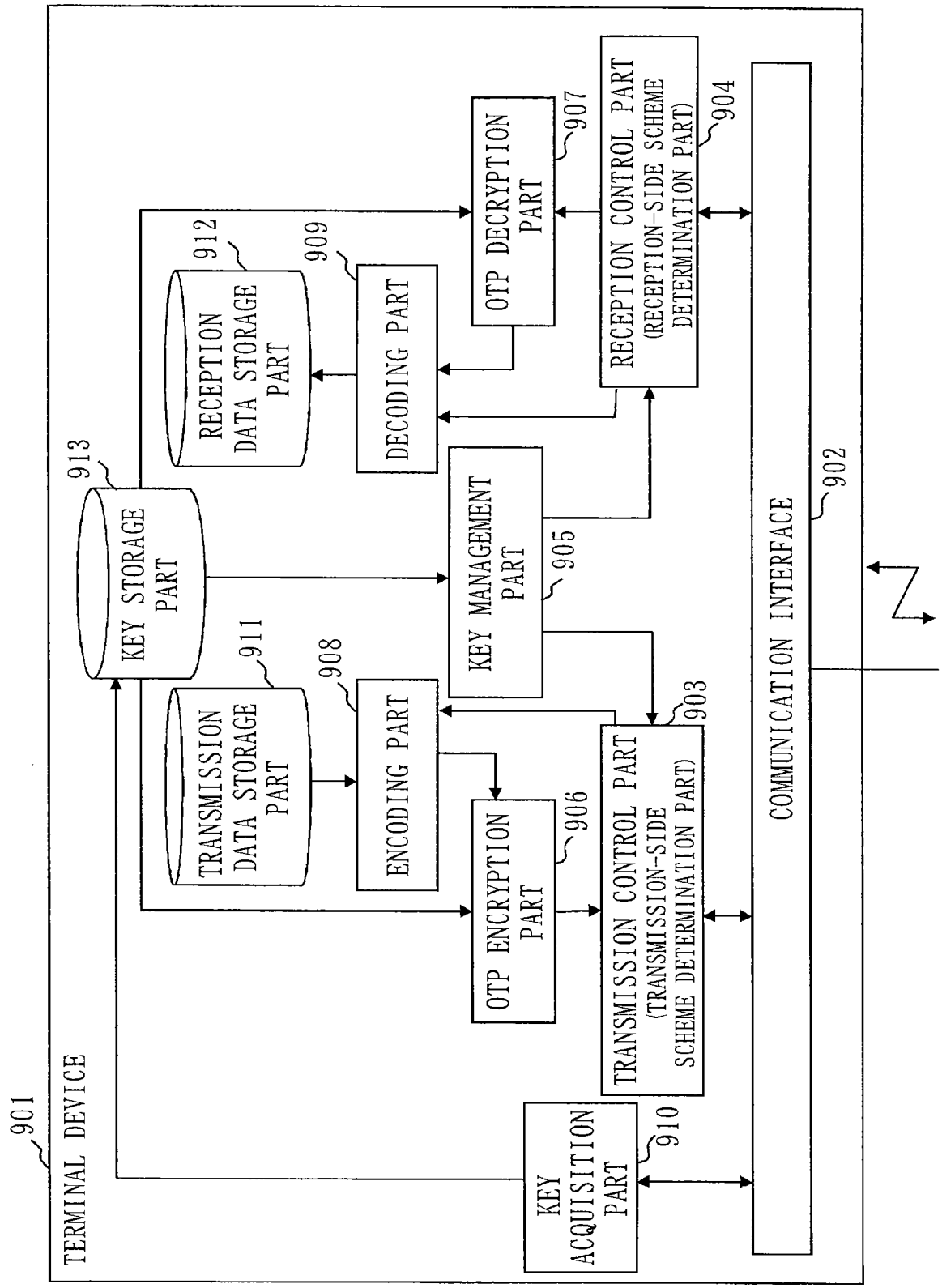
[FIG. 9] is a function block diagram showing the functional configuration of the terminal device A 102 and the terminal device B in Embodiment 1.

FIG. 9 is a function block diagram showing the functional configuration of the terminal device A 102 and the terminal device B 103 in Embodiment 1. The terminal device A 102 and the terminal device B 103 have the same functional configuration. Hence, a terminal device 901 will be described hereinafter to represent both the terminal device A 102 and the terminal device B 103.

The terminal device 901 includes a communication interface 902, a transmission control part 903 (transmission-side scheme determination part), a reception control part 904 (reception-side scheme determination part), a key management part 905, an OTP encryption part 906, an OTP decryption part 907, an encoding part 908, a decoding part 909, a key acquisition part 910, a transmission data storage part 911, a reception data storage part 912, and a key storage part 913.

The communication interface 902 is a communication device that communicates with an external device. More specifically, the communication interface 902 is a device serving to receive the OTP cipher key from the key sharing device C 104 and the key sharing device D 105. The communication interface 902 also serves to transmit encrypted communication data to a reception-side terminal device when the terminal device 901 is on the transmission side of cipher communication, and to receive encrypted communication data from a transmission-side terminal device when the communication device 901 is on the reception side of cipher communication.

The transmission control part 903 refers to the remaining amount information of the OTP cipher key obtained from the key management part 905, and determines, by the processing device, whether to employ the encoding scheme A or B. Then, the transmission control part 903 has the encoding part 908 encode the transmission data according to the determined encoding scheme to generate the communication data. The transmission control part 903 also has the OTP encryption part 906 encrypt the generated communication data, and transmits the generated encrypted communication data to the reception-side terminal device.

The reception control part 904 receives the encrypted communication data from the transmission-side terminal device, and has the OTP decryption part 907 decrypt the received encrypted communication data to generate the communication data. The reception control part 904 refers to the remaining amount information of the OTP cipher key that can be obtained from the key management part 905, and determines, by the processing device, whether to employ the encoding scheme A or B. Then, the reception control part 904 has the decoding part 909 decode the communication data according to the determined encoding scheme to obtain the transmission data.

The key management part 905 provides the information on the remaining amount of the OTP cipher key stored in the key storage part 913 to the transmission control part 903 and the reception control part 904. More specifically, the key management part 905 provides the information indicating whether the remaining amount of the OTP cipher key is equal to or greater than the predetermined threshold value.

The OTP encryption part 906 obtains the communication data from the encoding part 908 and obtains the OTP cipher key from the key storage part 913. Using the processing device, the OTP encryption part 906 encrypts the communication data with the OTP cipher using the OTP cipher key to generate the encrypted communication data. The obtained encrypted communication data is passed to the transmission control part 903.

The OTP decryption part 907 obtains the OTP cipher key from the key storage part 913 and obtains the encrypted communication data from the reception control part 904. Using the processing device, the OTP decryption part 907 decrypts the encrypted communication data by the OTP cipher key to generate the communication data. The obtained communication data is passed to the decoding part 909.

The encoding part 908 receives the transmission data from the transmission data storage part 911 and encodes the transmission data using the processing device. At this time, the encoding scheme determined by the transmission control part 903 is employed. The encoded transmission data is passed to the OTP encryption part 906 as the communication data.

The decoding part 909 obtains the decrypted communication data from the OTP decryption part 907 and decodes, using the processing device, the decrypted communication data according to the encoding scheme. At this time, the encoding scheme determined by the reception control part 904 is employed. The decoded received data is stored in the reception data storage part 912.

The key acquisition part 910 obtains the OTP cipher key from a key sharing device such as the key sharing device C 104, the key sharing device D 105, or the like, and stores the obtained OTP cipher key in the key storage part 913.

The transmission data storage part 911 is a storage device that stores the communication data to be transmitted to the reception-side terminal device.

The reception data storage part 912 is a storage device that stores the communication data obtained from the transmission-side terminal device.

The key storage part 913 is a storage device that stores the OTP cipher key.

The process of the terminal device A 102 which is the transmission-side terminal device will now be described in detail.

Figure 10:
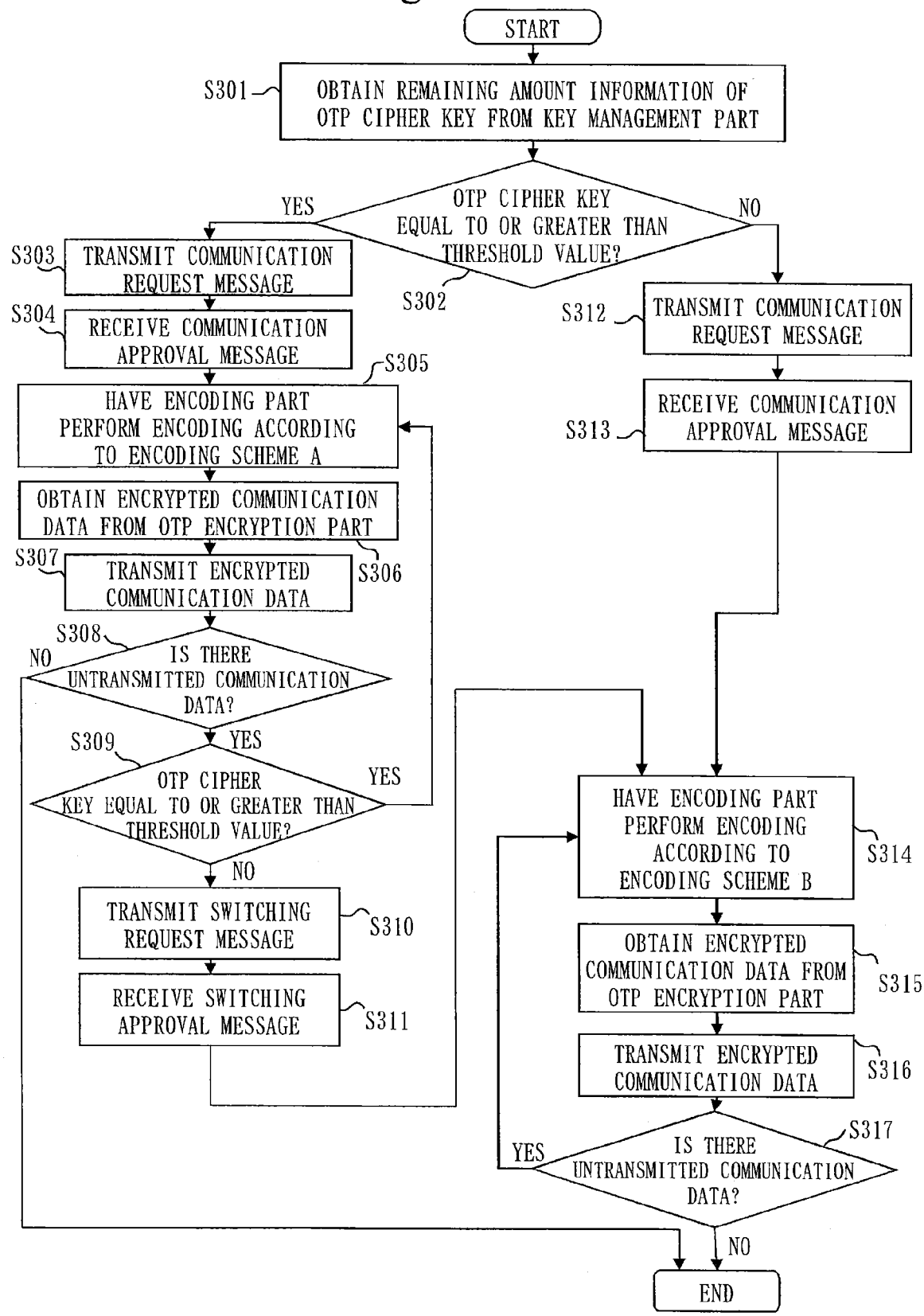
[FIG. 10] is a flowchart showing the process flow of a transmission control part 903 of a terminal device 901.

FIG. 10 is a flowchart showing the process flow of the transmission control part 903 of the terminal device 901.

The transmission control part 903 obtains from the key management part 905 the remaining amount information indicating whether the remaining amount of the OTP cipher key is running low (S301). If the remaining amount of the OTP cipher key is equal to or greater than the threshold value (YES in S302), the transmission control part 903 advances to the process of S303. If the remaining amount is less than the threshold value (NO in S302), the transmission control part 903 advances to the process of S312 (S302).

The process from S303 through S311 will be described.

The transmission control part 903 transmits to the terminal device B 103 via the communication interface 902 a communication request message indicating that the encoding scheme A is to be employed as the encoding scheme (S303), and receives a communication approval message from the terminal device B 103 (S304). Then, the transmission control part 903 has the encoding part 908 encode the unit data amount of the transmission data according to the encoding scheme A to generate the communication data (S305). The transmission control part 903 has the OTP encryption part 906 encrypt the communication data to obtain the encrypted communication data (S306). The transmission control part 903 transmits the obtained encrypted communication data to the terminal device B 103 via the communication interface 902 (S307).

Then, the transmission control part 903 checks whether there is untransmitted communication data (S308). If there is no untransmitted communication data (NO in S308), the transmission control part 903 ends the process. On the other hand, if there is untransmitted communication data (YES in S308), the transmission control part 903 advances to the process of S309.

The transmission control part 903 obtains from the key management part 905 the remaining amount information indicating whether the remaining amount of the OTP cipher key is equal to or greater than the threshold value, and determines whether the encoding scheme needs to be switched (S309). If the remaining amount is equal to or greater than the threshold value (YES in S309), the transmission control part 903 returns to the process of S305. On the other hand, if the remaining amount is less than the threshold value (NO in S309), the transmission control part 903 advances to the process of S310.

The transmission control part 903 transmits a switching request message to the terminal device B 103 via the communication interface 902 (S310), receives a switching approval message from the terminal device B 103 (S311), and advances to the process of S314.

The process from S312 through S313 will be described.

The transmission control part 903 transmits to the terminal device B 103 a communication request message indicating that the encoding scheme B is to be employed as the encoding scheme (S312), receives a communication approval message from the terminal device B 103 (S313), and advances to the process of S314.

The process of S314 and subsequent steps will be described.

The transmission control part 903 has the encoding part 908 encode the unit data amount of the transmission data according to the encoding scheme B to generate the communication data (S314). The transmission control part 903 has the OTP encryption part 906 encrypt the communication data to obtain the encrypted communication data (S315). Then, the transmission control part 903 transmits the encrypted communication data to the terminal device B 103 (S316).

Then, the transmission control part 903 checks whether there is untransmitted communication data (S317). If there is no untransmitted communication data (NO in S317), the transmission control part 903 ends the process. On the other hand, if there is untransmitted communication data (YES in S317), the transmission control part 903 returns to the process of S314.

The process of the terminal device B 103 which is the reception-side terminal device will now be described in detail.

Figure 11:
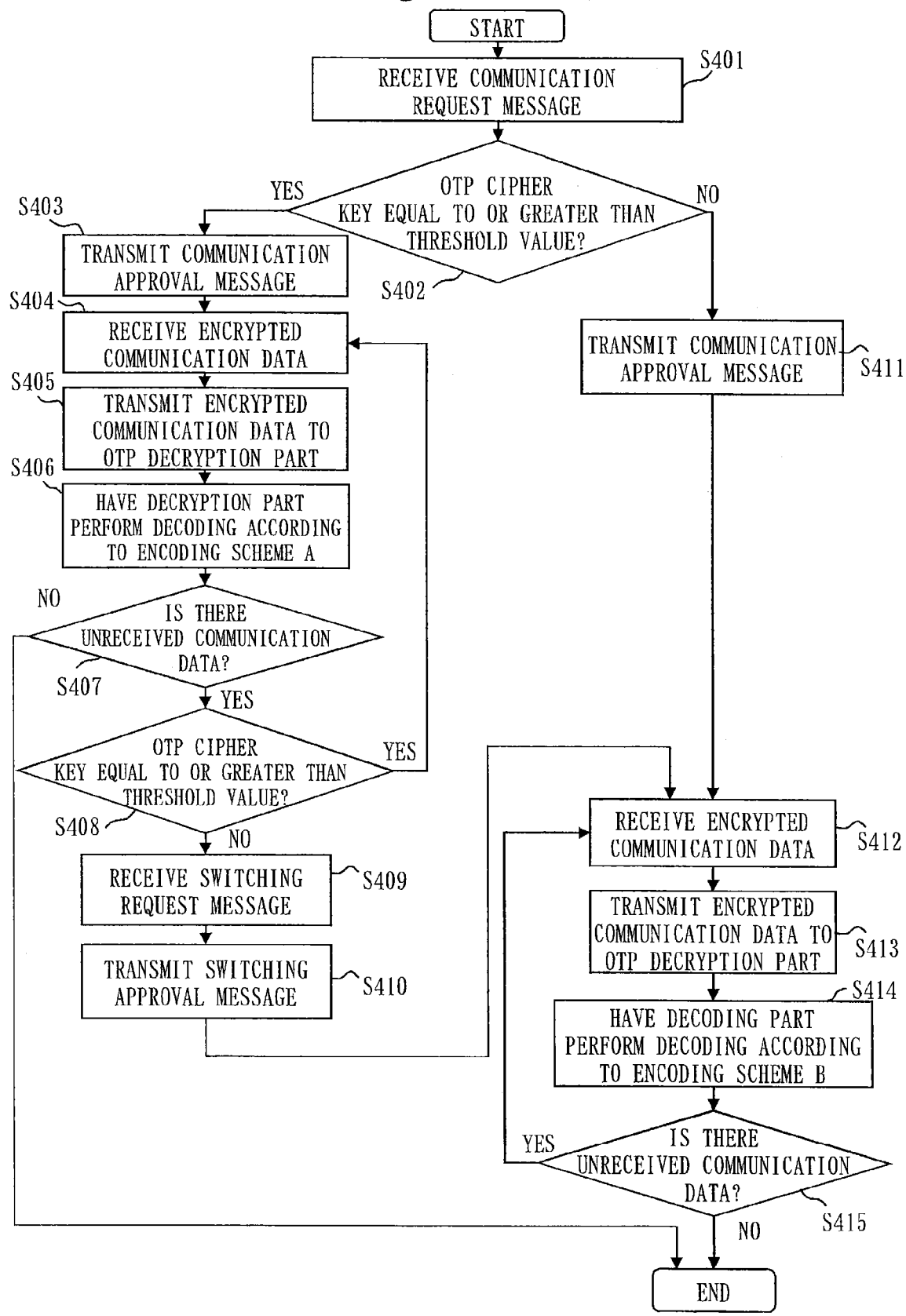
[FIG. 11] is a flowchart showing the process flow of a reception control part 904 of the terminal device 901.

FIG. 11 is a flowchart showing the process flow of the reception control part 904 of the terminal device 901.

The reception control part 904 receives a communication request message from the terminal device A 102 via the communication interface 902 (S401). The reception control part 904 checks the remaining amount of the OTP cipher key. If the remaining amount is equal to or greater than the threshold value, the reception control part 904 advances to the process of S403. If the remaining amount is less than the threshold value, the reception control part 904 advances to the process of S411 (S402).

The process from S403 through S410 will be described.

The reception control part 904 transmits a communication approval message to the terminal device A 102 via the communication interface 902 (S403), and receives the encrypted communication data from the terminal device A 102 (S404). The reception control part 904 transmits the received encrypted communication data to the OTP decryption part 907 to have it decrypted by the OTP decryption part 907 to generate the communication data (S405). The reception control part 904 has the decoding part 909 decode the generated communication data according to the encoding scheme A to generate the transmission data (S406). The generated transmission data is stored in the reception data storage part 912.

Then, the reception control part 904 checks whether there is unreceived communication data (S407). If there is no unreceived communication data (NO in S407), the reception control part 904 ends the process. On the other hand, if there is unreceived communication data (YES in S407), the reception control part 904 advances to the process of S408. Whether there is unreceived communication data is checked, for example, based on whether or not next encrypted communication data or a switching request message is transmitted within a predetermined time period.

The reception control part 904 obtains from the key management part 905 the remaining amount information indicating whether the remaining amount of the OTP cipher key is equal to or greater than the threshold value, and determines whether the encoding scheme needs to be switched (S408). If the remaining amount is equal to or greater than the threshold value (YES in S408), the reception control part 904 returns to the process of S404. On the other hand, if the remaining amount is less than the threshold value (NO in S408), the reception control part 904 advances to the process of S409.

The reception control part 904 receives a switching request message from the terminal device A 102 (S409), transmits a switching approval message to the terminal device A 102 (S410), and advances to the process of S412.

The process of S411 will be described.

The reception control part 904 transmits a communication approval message to the terminal device A 102 (S411), and advances to the process of S412.

The process of S412 and subsequent steps will be described.

The reception control part 904 receives the encrypted communication data from the terminal device A 102 (S412). The reception control part 904 transmits the received encrypted communication data to the OTP decryption part 907 to have it decrypted by the OTP decryption part 907 to generate the communication data (S413). The reception control part 904 has the decoding part 909 decode the generated communication data according to the encoding scheme B to generate the transmission data (S414). The generated transmission data is stored in the reception data storage part 912.

Then, the reception control part 904 checks whether there is unreceived communication data (S415). If there is no unreceived communication data (NO in S415), the reception control part 904 ends the process. On the other hand, if there is unreceived communication data (YES in S415), the reception control part 904 returns to the process of S412.

In the above description, the reception control part 904 determines in S408 whether the remaining amount of the OTP cipher key is equal to or greater than the threshold value in order to decide whether the encoding scheme needs to be switched. Alternatively, instead of determining whether or not the OTP cipher key is equal to or greater than the threshold value, the reception control part 904 may decide whether the encoding scheme is to be switched based on whether or not a switching request message is received from the terminal device A 102.

The functions of the key sharing device C 104 and the key sharing device D 105 in Embodiment 1 will now be described.

Figure 12:
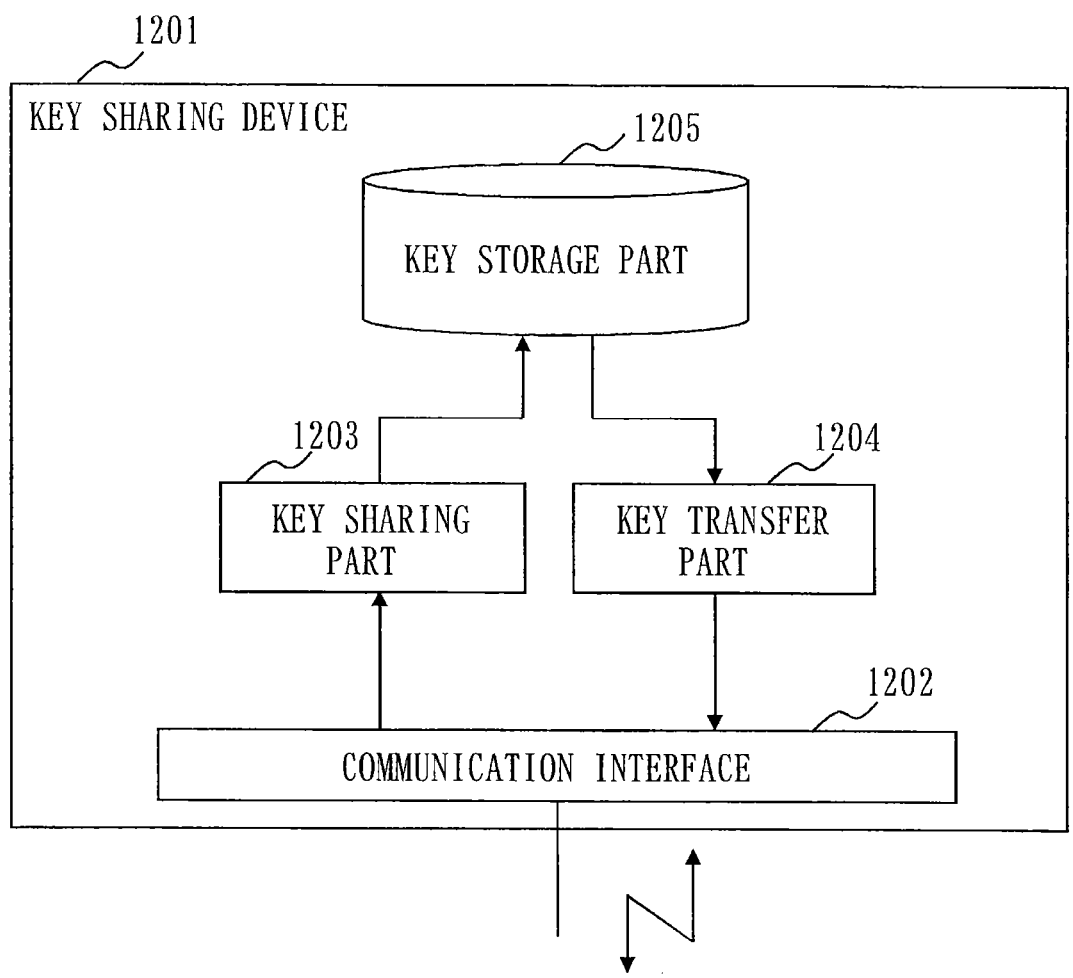
[FIG. 12] is a function block diagram showing the functional configuration of the key sharing device C 104 and the key sharing device D 105 in Embodiment 1.

FIG. 12 is a function block diagram showing the functional configuration of the key sharing device C 104 and the key sharing device D 105 in Embodiment 1. The key sharing device C 104 and the key sharing device D 105 have the same functional configuration. Hence, a key sharing device 1201 will be described hereinafter to represent both the key sharing device C 104 and the key sharing device D 105.

The key sharing device 1201 includes a communication interface 1202, a key sharing part 1203, a key transfer part 1204, and a key storage part 1205.

The communication interface 1202 is a communication device that communicates with an external device. More specifically, the communication interface 1202 is a device serving to communicate with another key sharing device to share the OTP cipher key. The communication interface 1202 also transmits the OTP cipher key to a terminal device connected to the communication interface 1202 via a communication cable or the like.

The key sharing part 1203 communicates with another key sharing device to share the OTP cipher key, and stores the shared OTP cipher key in the key storage part 1205.

The key transfer part 1204 obtains the OTP cipher key from the key storage part 1205 and transmits the OTP cipher key to the terminal device.

The key storage part 1205 is a storage device that stores the OTP cipher key obtained through communication with another key sharing device.

As described above, in the encryption system 1 according to Embodiment 1, the remaining amount of the OTP cipher key is checked as appropriate during cipher communication using the OTP cipher which is conducted between two parties. If the remaining amount of the OTP cipher key is less than the predetermined threshold value during or at the start of cipher communication, the encoding scheme is switched to the encoding scheme having the lower bit rate. With this arrangement, the amount of the OTP cipher key consumed per unit time can be reduced, and a period of time before the OTP cipher key is exhausted can be prolonged. Therefore, OTP cipher communication can be continued for a longer period of time.

In Embodiment 1, the encoding scheme is switched when the remaining amount of the OTP cipher key falls below the predetermined threshold value. The remaining amount of the OTP cipher key can be checked within each device, so that switching of the encoding scheme can be realized without requiring determination or processing by the user of the terminal device A 102 or terminal device B 103.

While the encoding scheme having the lower bit rate (the encoding scheme B in the above description) is being used, there may be a situation where the terminal device A 102 and the terminal device B 103 newly obtain the OTP cipher key from the key sharing device C 104 and the key sharing device D 105 and, as a result, the remaining amount of the OTP cipher key rises to or above the threshold value. In this case, the terminal device A 102 and the terminal device B 103 may switch to the encoding scheme having the higher bit rate (the encoding scheme A in the above description).

Embodiment 2

In Embodiment 1, the description has been provided on the premise that the terminal device and the key sharing device are connected with each other. However, when the terminal device is a mobile terminal such as a cellular phone, for example, there may be a situation where the terminal device and the key sharing device are not connected with each other. In this case, the time at which the OTP cipher key is transferred from the key sharing device to the terminal device may differ in each terminal device. As a result, the amount of the cipher key held by one terminal device may differ from the amount of the cipher key held by the other terminal device.

For example, assume that the terminal device A 102 obtains the OTP cipher key from the key sharing device C 104 at a given point in time. Then, the OTP cipher key is newly shared between the key sharing device C 104 and the key sharing device D 105. Then, assume that the terminal device B 103 obtains the OTP cipher key from the key sharing device D 105. As a result, the terminal device B 103 holds a portion of the OTP cipher key which is not held by the terminal device A 102. In this case, when cipher communication takes place between the terminal device A 102 and the terminal device B 103, the OTP cipher key of the terminal device A 102 will run out first.

In Embodiment 2, the description will be directed to an embodiment in which information on the OTP cipher key held by each terminal device is shared between the terminal devices before starting cipher communication, and the encoding scheme is switched depending on the conditions of the OTP cipher keys held by the respective terminal devices.

In Embodiment 2, the process of a case will be first described where the terminal device A 102 and the terminal device B 103 start cipher communication using the OTP cipher, and then at the point where the remaining amount of the OTP cipher key falls below the predetermined threshold value, the encoding scheme is switched to the encoding scheme having the lower bit rate.

Figure 13:
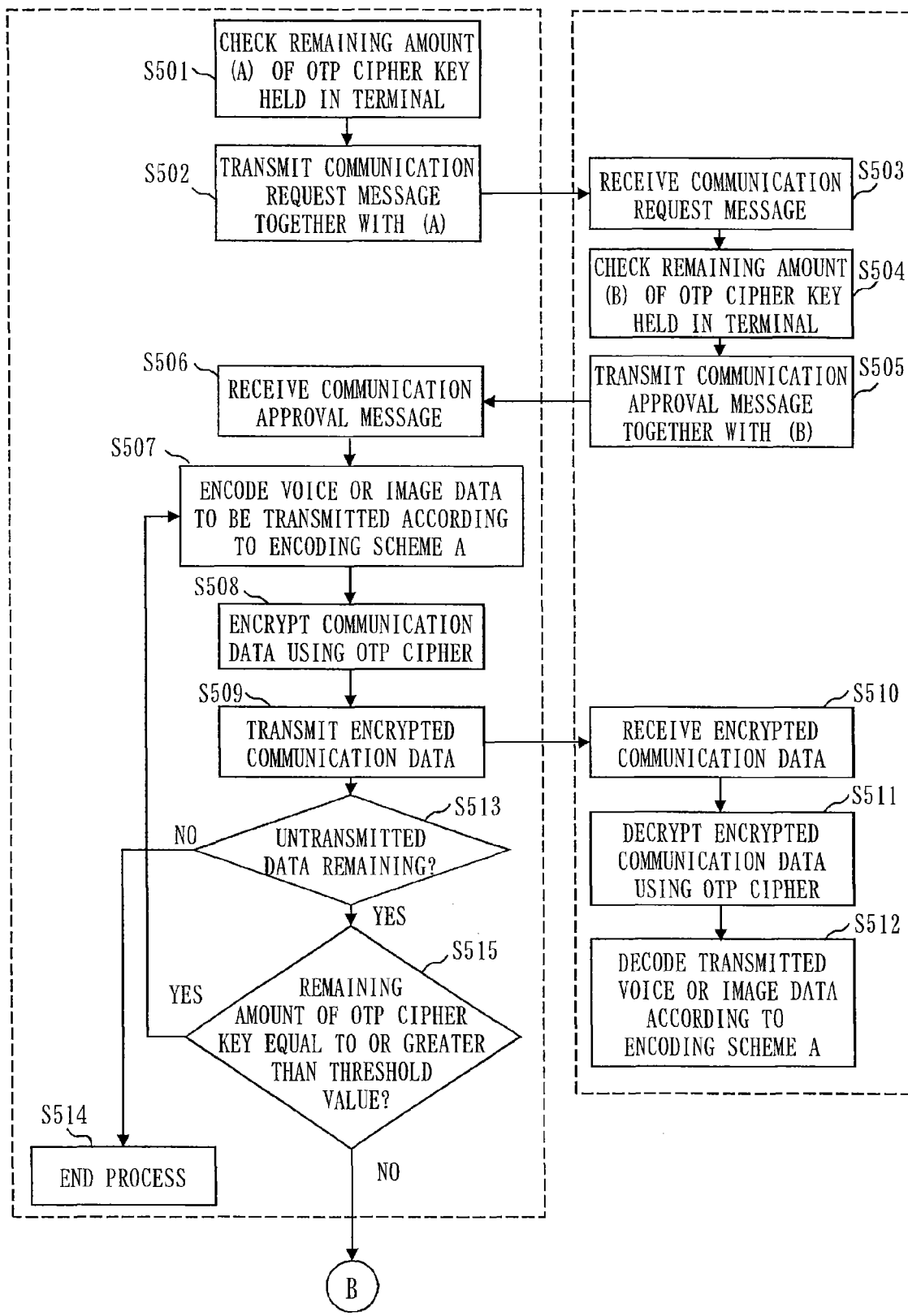
[FIG. 13] is a flowchart showing the flow of the communication process of FIG. 4 in Embodiment 2.
Figure 14:
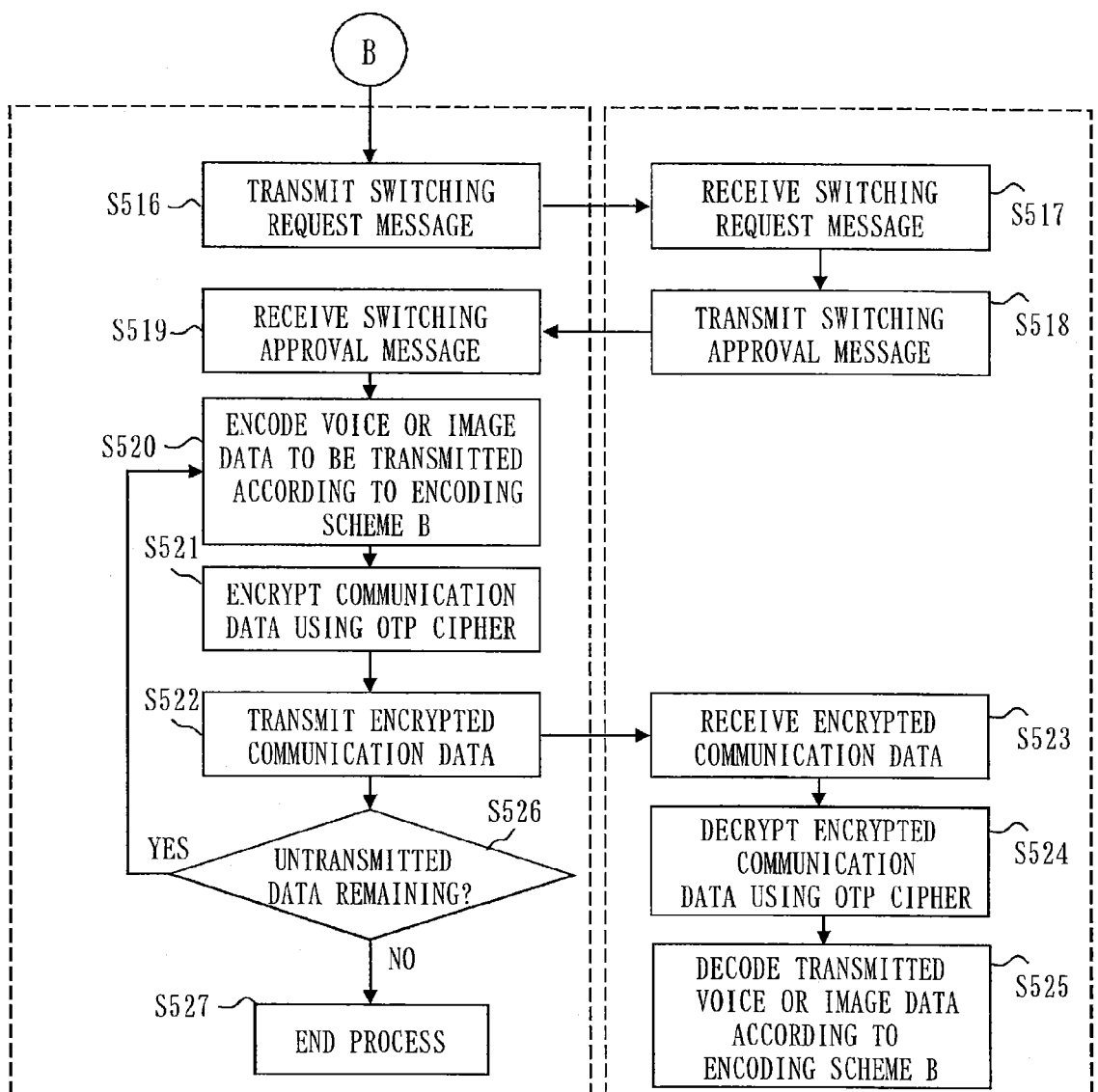
[FIG. 14] is a flowchart showing the flow of the communication process of FIG. 4 in Embodiment 2.

FIGS. 13 and 14 are flowcharts showing the flow of the communication process of FIG. 4 in Embodiment 2. In the process shown in FIGS. 13 and 14, in addition to the process of FIGS. 5 and 6 in Embodiment 1, a process of informing the remaining amount of the OTP cipher key of each terminal device to the terminal device at the other side is performed in advance.

The terminal device A 102 checks the remaining amount of the OTP cipher key 401, and confirms that the remaining amount of the OTP cipher key 401 is equal to or greater than the predetermined threshold value (S501). Then, the terminal device A 102 transmits to the terminal device B 103 the communication request message 403 indicating that the encoding scheme A is to be employed as the encoding scheme together with the remaining amount value of the OTP cipher key 401 (S502).

The terminal device B 103 receives the communication request message 403 from the terminal device A 102 (S503). The terminal device B 103 checks the amount of the OTP cipher key 402 it holds (S504). Then, the terminal device B 103 sends to the terminal device A 102 the communication approval message 404 together with the remaining amount value of the OTP cipher key 402 (S505).

The terminal device A 102 receives the communication approval message 404 from the terminal device B 103 (S506). The terminal device A 102 encodes the unit data amount of the voice or image data to be transmitted according to the encoding scheme A to generate the communication data (S507), and encrypts the communication data with the OTP cipher key 401 to generate the encrypted communication data 405 (S508). Then, the terminal device A 102 transmits the encrypted communication data 405 to the terminal device B 103 (S509).

The terminal device B 103 receives the encrypted communication data 405 from the terminal device A 102 (S510), and decrypts the encrypted communication data 405 with the OTP cipher key 402 to obtain the communication data (S511). The terminal device B 103 decodes the communication data according to the encoding scheme A to obtain the voice or image data (S512).

Following S509, the terminal device A 102 checks whether there is untransmitted voice or image data (S513). If there is no untransmitted voice or image data (NO in S513), the terminal device A 102 ends the process (S514). On the other hand, if there is untransmitted voice or image data (YES in S513), the terminal device A 102 advances to the process of S515.

The terminal device A 102 checks whether the remaining amount of the OTP cipher key in the terminal device A 102 checked in S501 or the remaining amount of the OTP cipher key in the terminal device B 103 received in S506, whichever is smaller, is equal to or greater than the predetermined threshold (S515).

If the data amount that can be handled with cipher communication using the OTP cipher is equal to or greater than the predetermined threshold (YES in S515), the terminal device A 102 returns to the process of S507. On the other hand, if the data amount that can be handled with cipher communication using the OTP cipher is less than the predetermined threshold (NO in S515), the terminal device A 102 transmits to the terminal device B 103 the switching request message 406 indicating that the encoding scheme is to be switched to the encoding scheme B, and informs the terminal device B 103 of switching of the encoding scheme (S516 through S519).

The process from S520 through S527 is substantially the same as the process from S120 through S127 shown in FIG. 6 and thus will not be described.

Next, the operation of a case will be briefly described where the remaining amount of the OTP cipher key held by the terminal device B 103 is less than the predetermined threshold value at the start of cipher communication, and thus a sufficient amount of cipher communication cannot be performed with encoding according to the encoding scheme A. In this case, cipher communication is started from the beginning with encoding according to the encoding scheme B having the lower bit rate.

Figure 15:
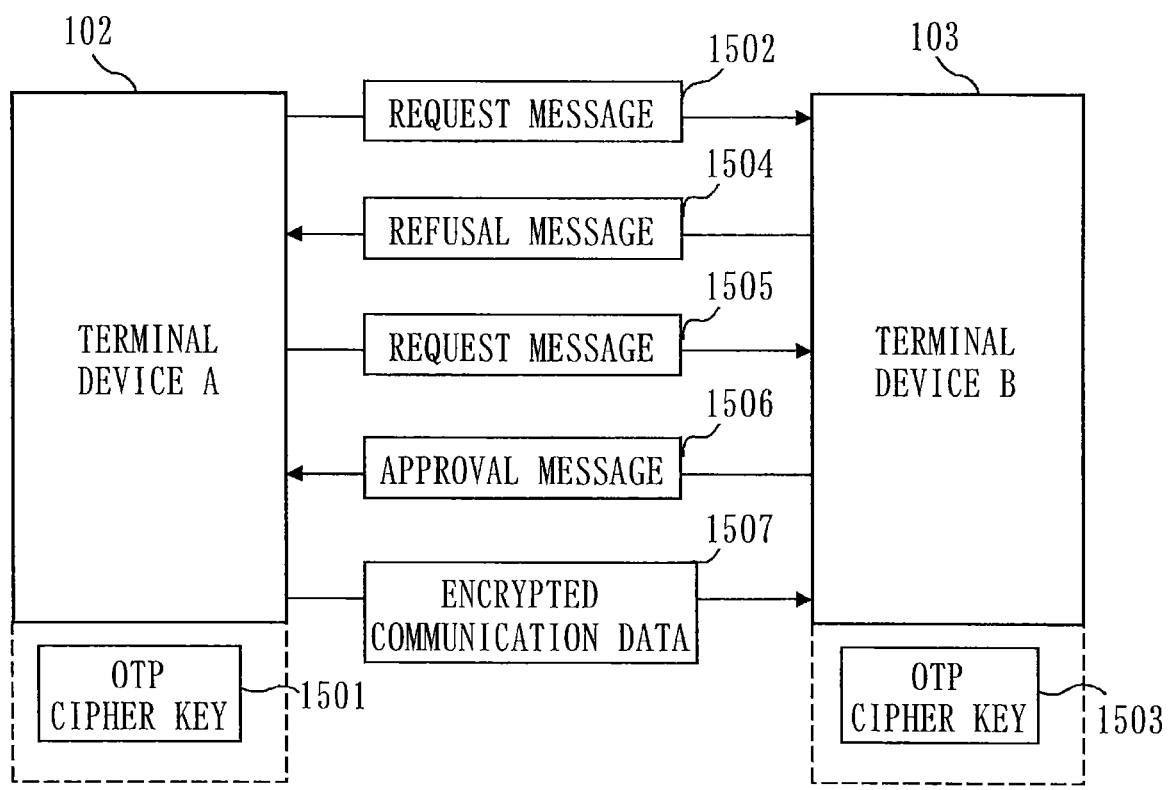
[FIG. 15] is a diagram briefly showing the operation of a case where the terminal device A 102 and the terminal device B 103 start cipher communication with encoding according to the encoding scheme B because the remaining amount of the OTP cipher key held by the terminal device B 103 is less than the predetermined threshold value at the start of cipher communication.

FIG. 15 is a diagram briefly showing the operation of the case where the terminal device A 102 and the terminal device B 103 start cipher communication with encoding according to the encoding scheme B because the remaining amount of the OTP cipher key held by the terminal device B 103 is less than the predetermined threshold value at the start of the cipher communication.

First, the terminal device A 102 checks the amount of an OTP cipher key 1501 it holds, and transmits a communication request message 1502 to the terminal device B 103. Upon receiving the communication request message 1502, the terminal device B 103 checks that the amount of an OTP cipher key 1503 is less than the predetermined threshold, and transmits a communication refusal message 1504.

Upon receiving the communication refusal message 1504, the terminal device A 102 transmits a switching request message 1505 to the terminal device B 103. Upon receiving the switching request message 1505, the terminal device B 103 transmits a switching approval message 1506 to the terminal device A 102.

The subsequent process is substantially the same as the process shown in FIG. 7 and thus will not be described.

Figure 16:
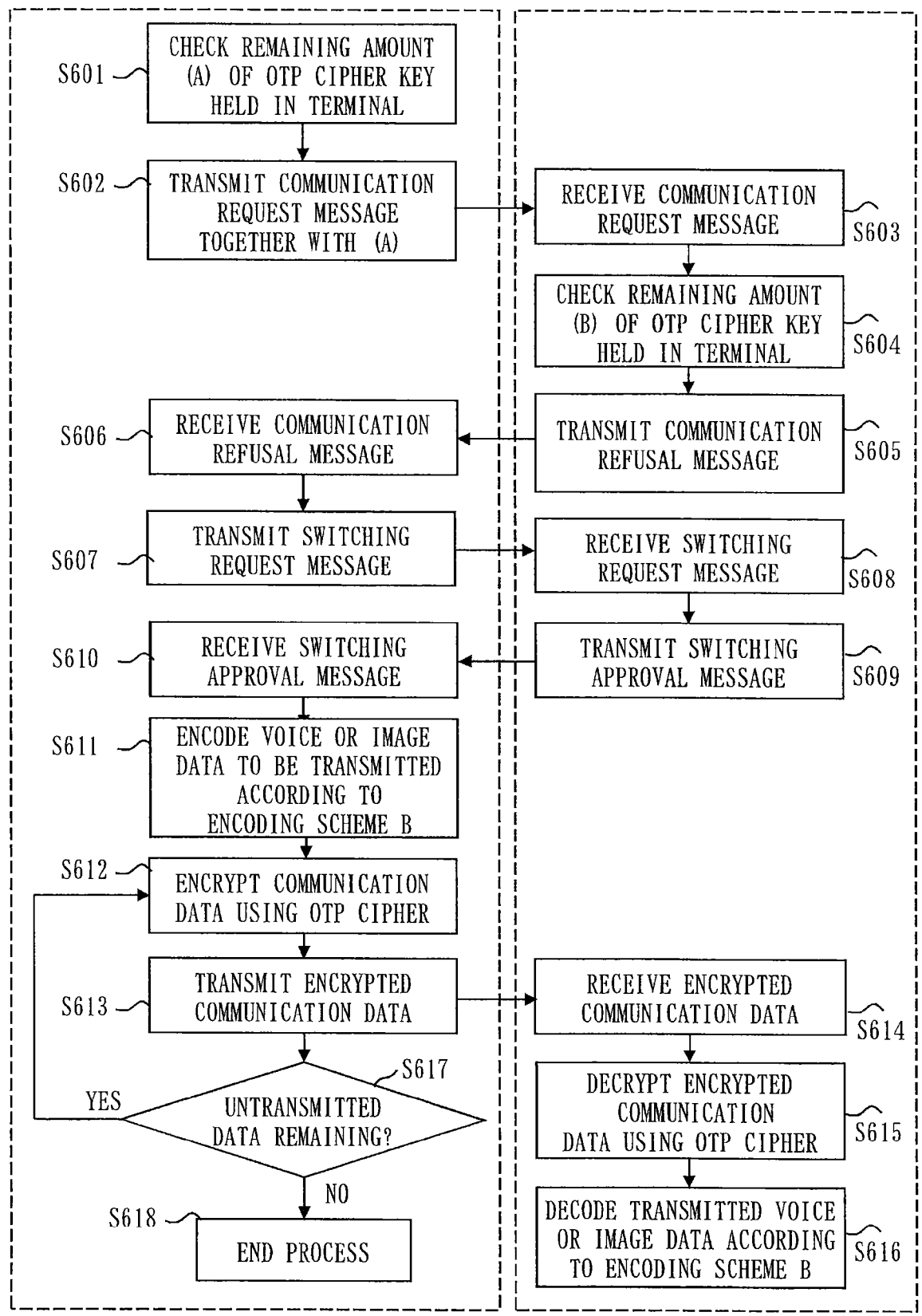
[FIG. 16] is a flowchart showing the flow of the communication process of FIG. 15 in Embodiment 2.

The communication process of FIG. 15 will now be described in detail. FIG. 16 is a flowchart showing the flow of the communication process of FIG. 15 in Embodiment 2.

First, the terminal device A 102 checks the remaining amount of the OTP cipher key 1501, and confirms that the remaining amount of the OTP cipher key 1501 is equal to or greater than the predetermined threshold value (S601). Then, the terminal device A 102 transmits to the terminal device B 103 the communication request message 1502 indicating that the encoding scheme A is to be employed as the encoding scheme (S602).

The terminal device B 103 receives the communication request message 1502 from the terminal device A 102 (S603). The terminal device B 103 checks the amount of the OTP cipher key it holds, and confirms that the remaining amount of the OTP cipher key 1503 it holds is less than the predetermined threshold value (S604). Then, the terminal device B 103 transmits the communication refusal message 1504 to the terminal device A 102 (S605).

The terminal device A 102 receives the communication refusal message 1504 from the terminal device B 103 (S606). The terminal device A 102 transmits to the terminal device B 103 the switching request message 1505 indicating that the encoding scheme is to be switched to the encoding scheme B, and informs the terminal device B 103 of switching of the encoding scheme (S607 through S610).

The process from S611 through S618 is substantially the same as the process from S206 through S213 shown in FIG. 8 and thus will not be described.

The process of the terminal device A 102 which is the transmission-side terminal device will now be described in detail.

Figure 17:
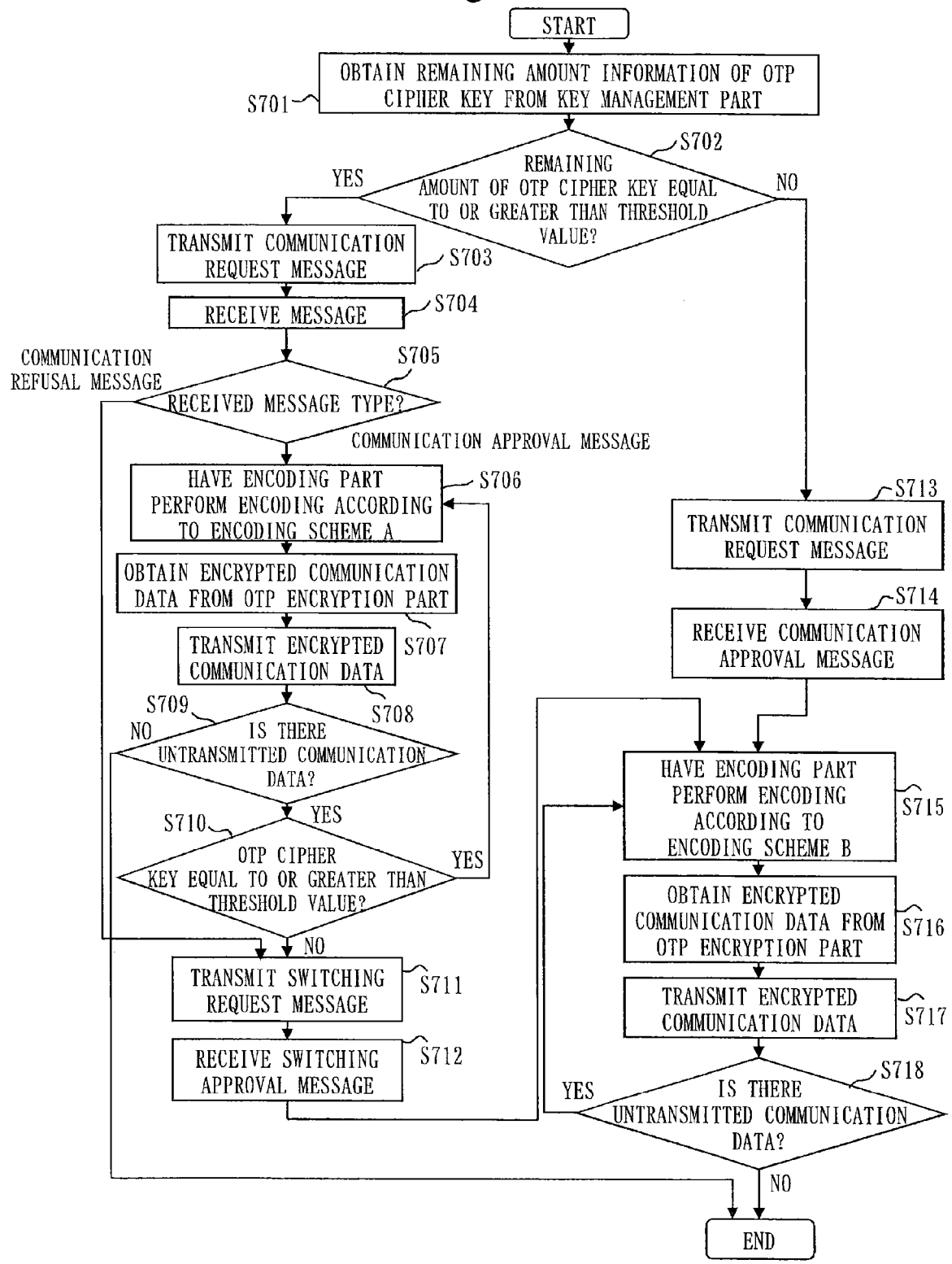
[FIG. 17] is a flowchart showing the process flow of the transmission control part 903 of the terminal device 901 in Embodiment 2.

FIG. 17 is a flowchart showing the process flow of the transmission control part 903 of the terminal device 901 in Embodiment 2.

The transmission control part 903 obtains from the key management part 905 the remaining amount information indicating whether the remaining amount of the OTP cipher key is running low (S701). If the remaining amount of the OTP cipher key is equal to or greater than the threshold value (YES in S702), the transmission control part 903 advances to the process of S703 (S702). If the remaining amount is less than the threshold value (NO in S702), the transmission control part 903 advances to the process of S713 (S702).

The transmission control part 903 transmits to the terminal device B 103 via the communication interface 902 a communication request message indicating that the encoding scheme A is to be employed as the encoding scheme (S703), and receives a message from the terminal device B 103 (S704). Then, the transmission control part 903 determines whether the received message is a communication approval message or a communication refusal message (S705). If the received message is a communication approval message, the transmission control part 903 advances to the process of S706. If the received message is a communication refusal message, the transmission control part 903 advances to the process of S711 (S705).

The process from S706 through S718 is substantially the same as the process from S305 through S317 shown in FIG. 10 and thus will not be described.

The process of the terminal device B 103 which is the reception-side terminal device will now be described in detail.

Figure 18:
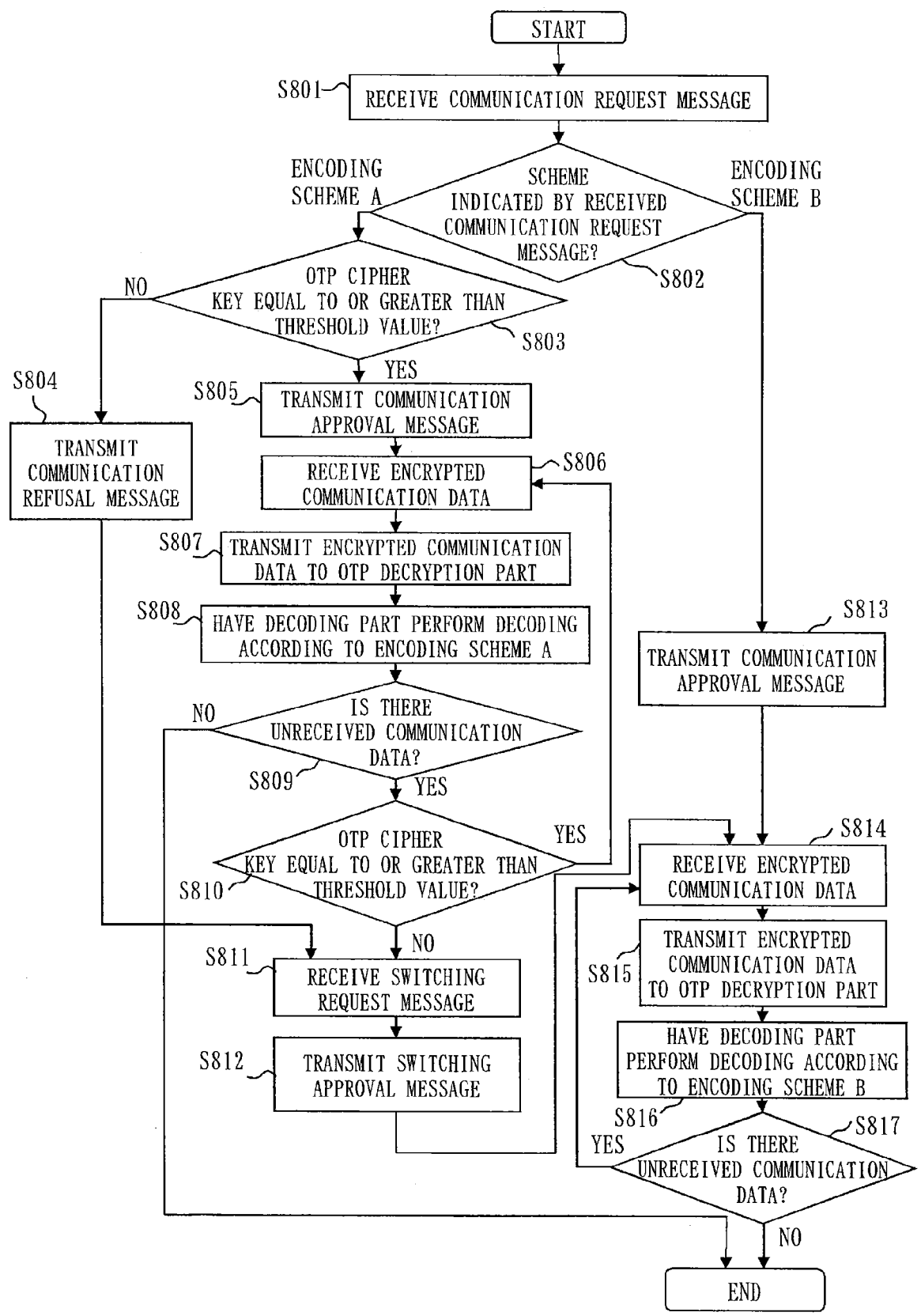
[FIG. 18] is a flowchart showing the process flow of the reception control part 904 of the terminal device 901 in Embodiment 2.

FIG. 18 is a flowchart showing the process flow of the reception control part 904 of the terminal device 901 in Embodiment 2.

The reception control part 904 receives a communication request message from the terminal device A 102 via the communication interface 902 (S801). The reception control part 904 determines whether the communication request message indicates the encoding scheme A or B as the encoding scheme to be employed (S802). If the communication request message indicates that the encoding scheme A is to be employed as the encoding scheme, the reception control part 904 advances to the process of S803. If the communication request message indicates that the encoding scheme B is to be employed as the encoding scheme, the reception control part 904 advances to the process of S813.

The reception control part 904 obtains from the key management part 905 the remaining amount information indicating whether the remaining amount of the OTP cipher key is running low (S803). If the remaining amount of the OTP cipher key is equal to or greater than the threshold value (YES in S803), the reception control part 904 advances to the process of S805. If the remaining amount of the OTP cipher key is less than the threshold value (NO in S803), the reception control part 904 advances to the process of S804. If the remaining amount of the OTP cipher key is less than the threshold value, the reception control part 904 transmits a communication refusal message to the terminal device A 102 (S804), and advances to the process of S811.

The process from S805 through S817 is substantially the same as the process from S403 through S415 shown in FIG. 11 and thus will not be described.

As described above, in the encryption system 1 according to Embodiment 2, each terminal device becomes aware of the remaining amount of the OTP cipher key held by the other device. Thus, the encoding scheme can be switched even if the OTP cipher key held by one terminal device differs from the OTP cipher key held by the other terminal device.

In the above description, the encoding scheme is switched simply depending on the remaining amount of the OTP cipher key of the terminal device A 102 or the terminal device B 103, whichever is smaller.

However, there may be a case where the OTP cipher key held by the terminal device A 102 is not exactly the same as the OTP cipher key held by the terminal device B 103. That is, there may be a case where a portion of the OTP cipher key held by the terminal device A 102 is not held by the terminal device B 103 and a portion of the OTP cipher key held by the terminal device B 103 is not held by the terminal device A 102. In this case, the encoding scheme needs to be switched depending on the remaining amount of the OTP cipher key held by both the terminal device A 102 and the terminal device B 103.

In this case, for example, when the terminal device obtains the OTP cipher key from the key sharing device, the terminal device counts the number of bits of the OTP cipher key. For example, when the terminal device first obtains 1000 bits of the OTP cipher key from the key sharing device, the terminal device counts the number of bits to determine that bits 1 to 1000 of the OTP cipher key have been obtained. Then, when the terminal device obtains 500 bits of the OTP cipher key from the key sharing device, the terminal device counts the number of bits to determine that bits 1001 to 1500 of the OTP cipher key have been obtained.

The terminal device also counts the number of bits of the OTP cipher key that have been used. For example, when 100 bits of the OTP cipher key are first used, the terminal device counts the number of bits to determine bits 1 to 100 of the OTP cipher key have been used.

Thus, the terminal device can be aware of which bits of the OTP cipher key currently remain available for use.

Instead of checking the remaining amount of the OTP cipher key, the terminal device A 102 checks which bits of the OTP cipher key remain available for use. The terminal device A 102 transmits to the terminal device B 103 information indicating which bits of the OTP cipher key remain available for use together with a communication request message.

The terminal device B 103 checks which bits of the OTP cipher key remain available for use. The terminal device B 103 identifies a common portion of the OTP cipher key held by the terminal device A 102 and the OTP cipher key held by the terminal device B 103. If the data amount (number of bits) of the common portion is equal to or greater than the predetermined threshold value, the terminal device B 103 transmits to the terminal device A 102 information indicating which bits of the OTP cipher key remain available for use together with a communication approval message. On the other hand, if the data amount of the common portion is less than the predetermined threshold value, the terminal device B 103 transmits to the terminal device A 102 information indicating which bits of the OTP cipher key remain available for use together with a communication refusal message.

Upon receiving the communication approval message, the terminal device A 102 identifies the common portion of the OTP cipher key held by the terminal device A 102 and the OTP cipher key held by the terminal device B 103. Then, the terminal device A encrypts the unit data amount of the communication data with the common portion of the OTP cipher key to generate the encrypted data, and transmits the encrypted data to the terminal device B 103.

The terminal device A 102 also checks whether the data amount that can be handled with cipher communication using the remaining common portion of the OTP cipher key is equal to or greater than the predetermined threshold value. If the data amount is equal to or greater than the threshold value, communication is performed by employing the encoding scheme A. If the data amount is less than the threshold value, communication is performed by switching the encoding scheme to the encoding scheme B.

Embodiment 3

In Embodiments 1 and 2, it is checked whether the remaining amount of the OTP cipher key held by the terminal device is equal to or greater than the predetermined threshold value. Then, if the remaining amount is equal to or greater than the threshold value, the encoding scheme having the higher bit rate is employed. If the remaining amount is less than the threshold value, the encoding scheme having the lower bit rate is employed. However, when voice or image data having a greater significance than normal is transmitted, there may be a situation where it is desirable to prevent deterioration of voice or image quality due to the encoding scheme having the lower bit rate. In this case, encoding should be performed at the higher bit rate. There may also be a situation where it is permissible to allow deterioration of voice or image quality due to the encoding scheme having the lower bit rate. In this case, encoding should be performed at the lower bit rate to reduce consumption of the OTP cipher key.

Accordingly, Embodiment 3 will describe that a significance level of communication data for cipher communication is determined based on the quality of voice, the state of communication, and so on, and the encoding scheme is switched based on the determined significance level.

In Embodiment 3, the process of a case will be first described where when the remaining amount of the OTP cipher key falls below the predetermined threshold value, the encoding scheme is switched to the encoding scheme having the lower bit rate only if the significance level is determined as low.

Figure 19:
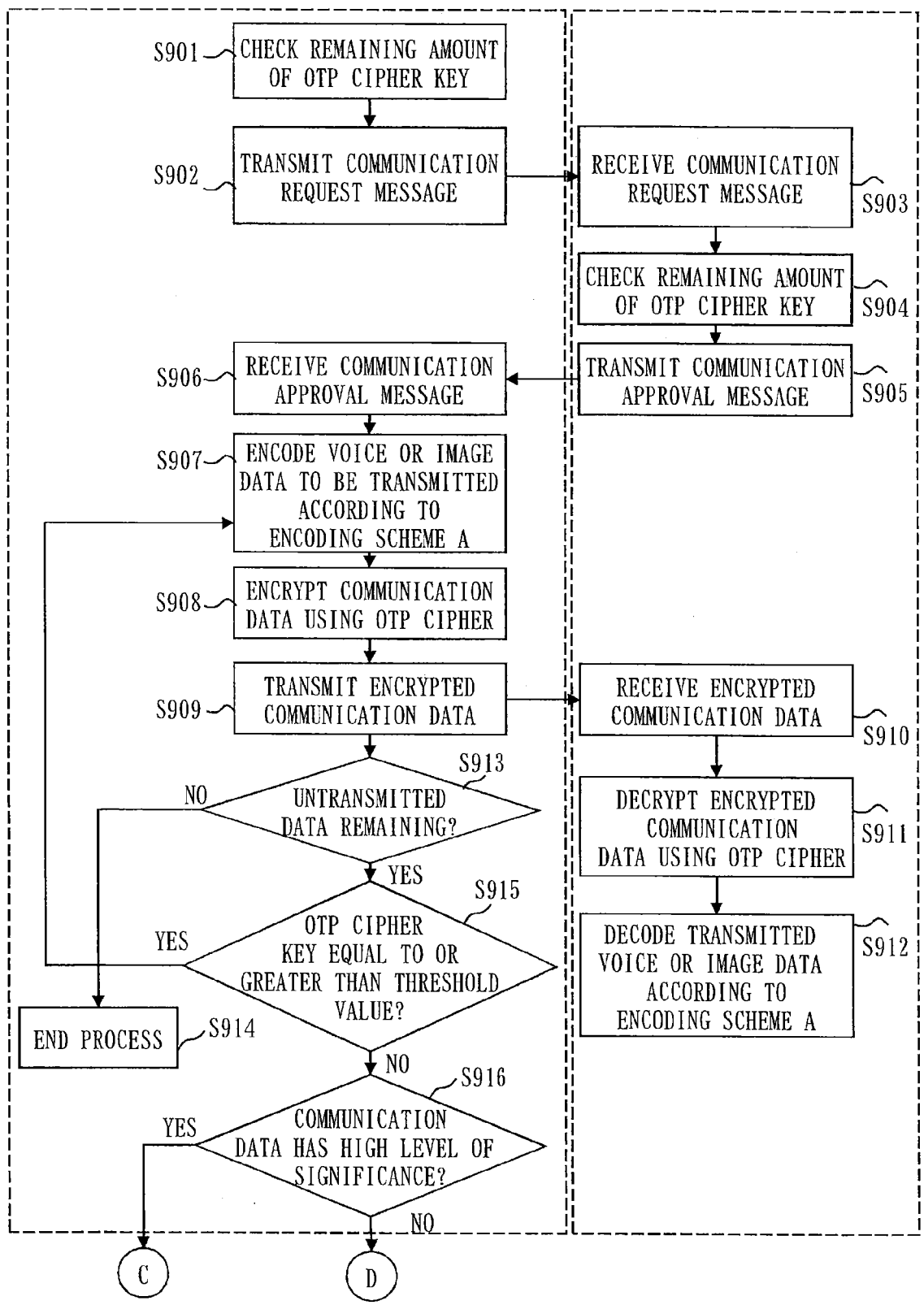
[FIG. 19] is a flowchart showing the flow of the communication process of FIG. 4 in Embodiment 3.
Figure 20:
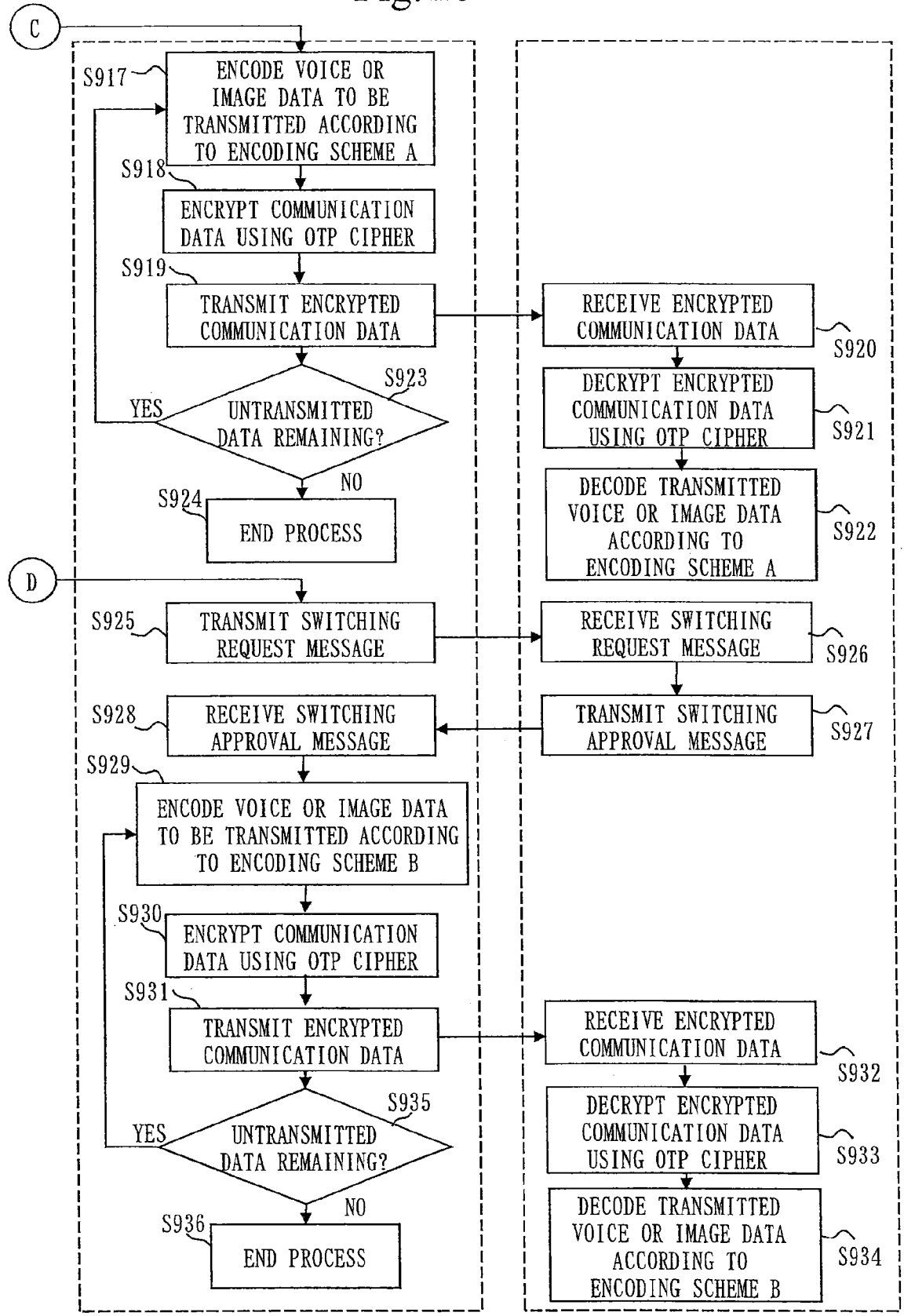
[FIG. 20] is a flowchart showing the flow of the communication process of FIG. 4 in Embodiment 3.

FIGS. 19 and 20 are flowcharts showing the flow of the communication process of FIG. 4 in Embodiment 3. In the process shown in FIGS. 19 and 20, in addition to the process of FIGS. 5 and 6 in Embodiment 1, a process of determining the significance level of transmission data is performed and the encoding scheme is switched depending on the determination result.

The process from S901 through S915 is substantially the same as the process from S101 through 5115 shown in FIG. 5 and thus will not be described.

If the remaining amount of the OTP cipher key is less than the threshold value (NO in S915), the terminal device A 102 determines whether the significance level of the transmission data is high (S916). If the significance level is high (YES in S916), the terminal device A 102 advances to the process of S917. On the other hand, if the significance level is low (NO in S916), the terminal device A 102 advances to the process of S925.

If the significance level is high (YES in S916), the terminal device A 102 continues with encoding using the encoding scheme A (S917 through S924). The process from S917 through 5924 is substantially the same as the process from S107 through S114 shown in FIGS. 5 and 6 and thus will not be described. However, in S923, if there is untransmitted voice or image data (YES in S923), the terminal device A 102 returns to the process of S917 and continues with encoding according to the encoding scheme A.

If the significance level is low (NO in S916), the terminal device A 102 transmits to the terminal device B 103 the switching request message 406 indicating that the encoding scheme is to be switched to the encoding scheme B, and informs the terminal device B 103 of switching of the encoding scheme (S925 through S928). Then, the terminal device A 102 continues with encoding according to the encoding scheme B (S929 through S936). The process from S929 through 5936 is substantially the same as the process from S120 through S127 shown in FIG. 6 and thus will not be described.

The process of a case will now be described where the remaining amount of the OTP cipher key is less than the predetermined threshold value at the start of cipher communication, but the encoding scheme having the lower bit rate is employed only when the significance level is determined as low.

Figure 21:
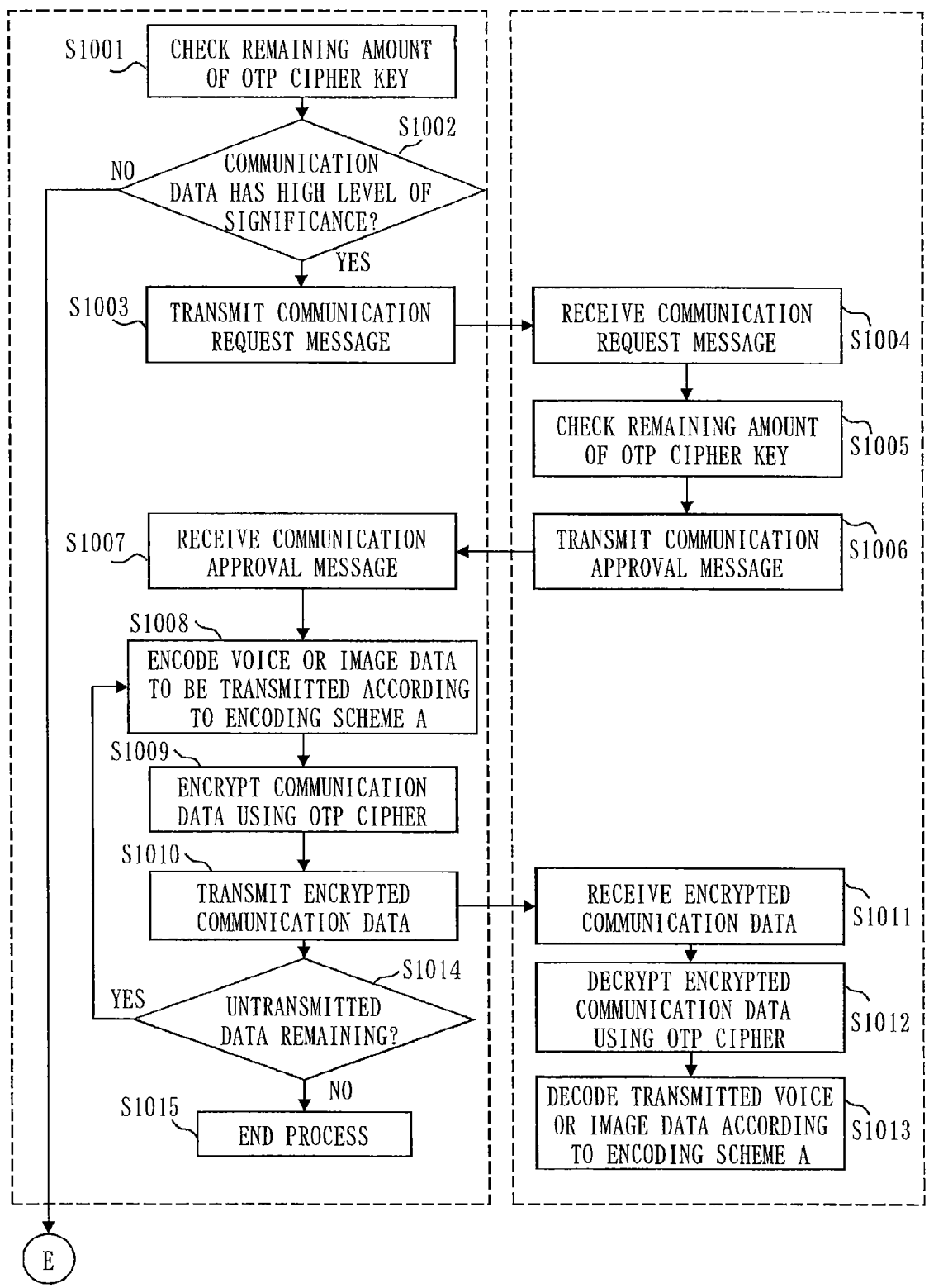
[FIG. 21] is a flowchart showing the flow of the communication process of FIG. 7 in Embodiment 3.
Figure 22:
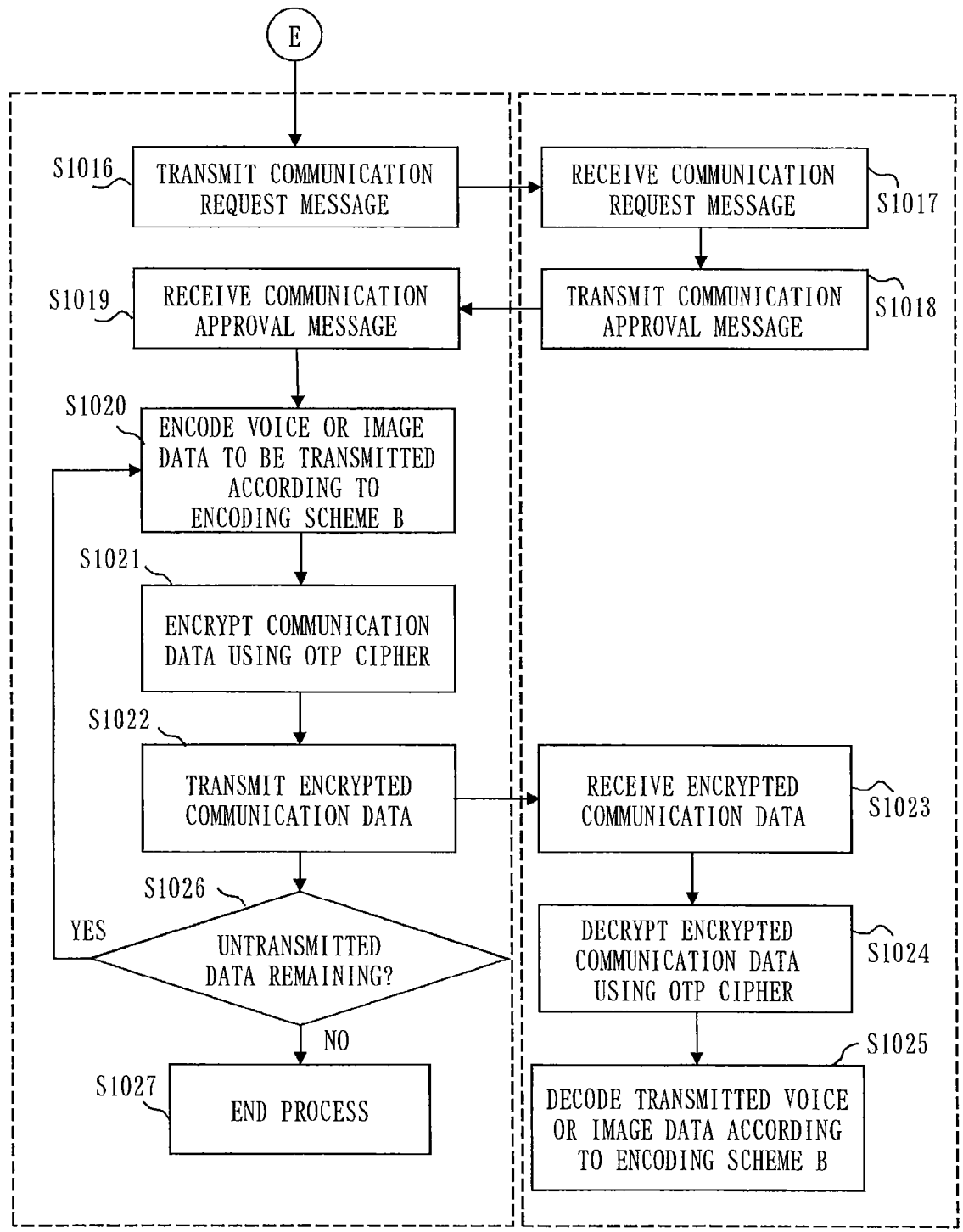
[FIG. 22] is a flowchart showing the flow of the communication process of FIG. 7 in Embodiment 3.

FIGS. 21 and 22 are flowcharts showing the flow of the communication process of FIG. 7 in Embodiment 3.

The terminal device A 102 checks the remaining amount of the OTP cipher key 401 it holds (S1001), and determines whether the significance level of the transmission data is high (S1002). If the significance level is high (YES in S1002), the terminal device A 102 advances to the process of S1003. On the other hand, if the significance level is low (NO in S1002), the terminal device A 102 advances to the process of S1016.

If the significance level is high (YES in S1002), the terminal device A 102 transmits to the terminal device B 103 the communication request message 701 indicating that the encoding scheme A is to be employed as the encoding scheme, and informs the terminal device B 103 that the encoding scheme A is to be employed (S1003 through S1007). Then, the terminal device A 102 continues with encoding according to the encoding scheme A (S1008 through S1015). The process from S1008 through S1015 is substantially the same as the process from S917 through 5924 shown in FIG. 20 and thus will not be described.

If the significance level is low (NO in S1002), the terminal device A 102 transmits to the terminal device B 103 the communication request message 701 indicating that the encoding scheme B is to be employed as the encoding scheme, and informs the terminal device B 103 that the encoding scheme B is to be employed (S1016 through S1019). Then, the terminal device A 102 continues with encoding according to the encoding scheme B (S1020 through S1027). The process from S1020 through 1027 is substantially the same as the process from S206 through S213 shown in FIG. 8 and thus will not be described.

The functions of the terminal device A 102 and the terminal device B 103 in Embodiment 3 will now be described.

Figure 23:
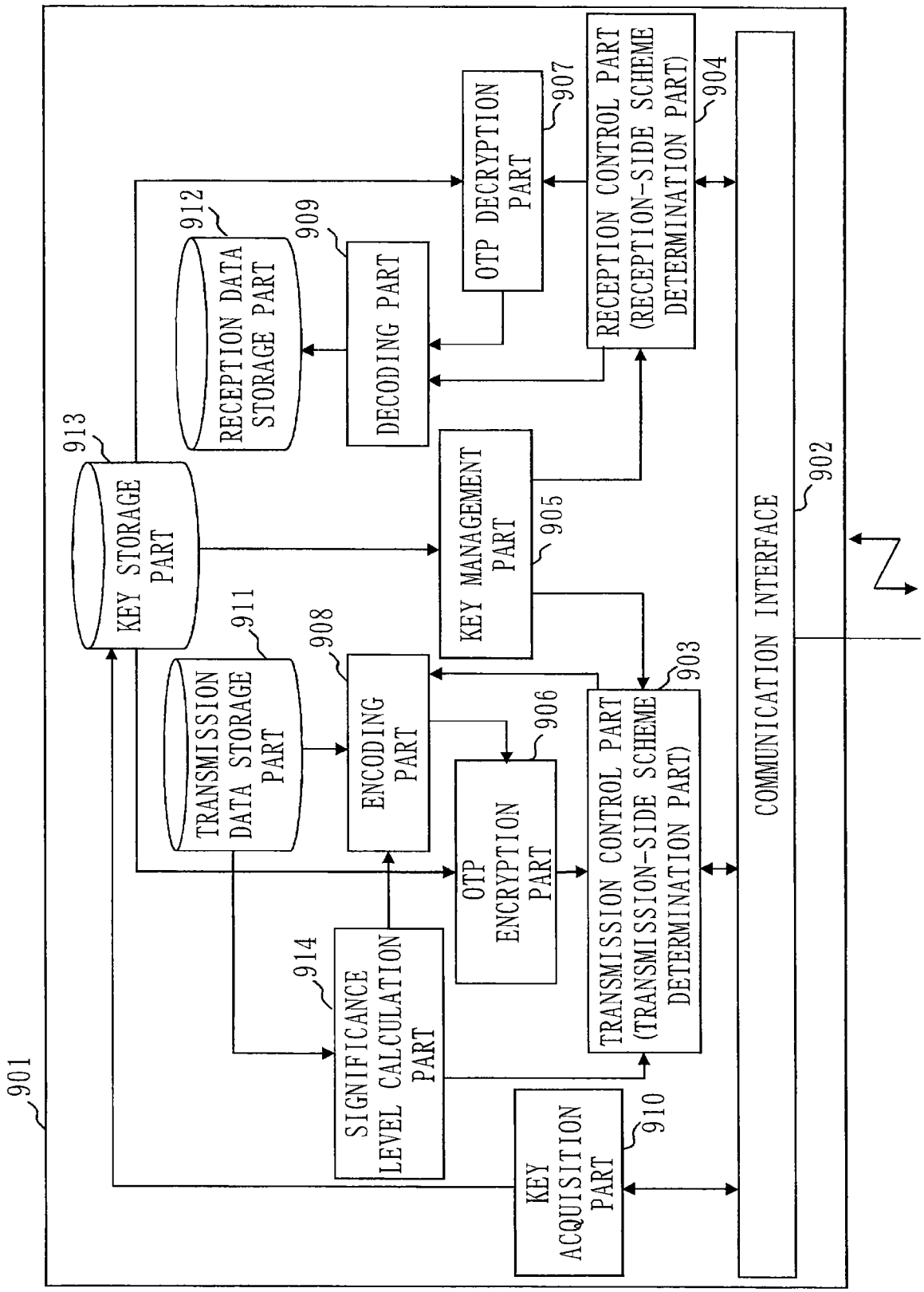
[FIG. 23] is a function block diagram showing the functional configuration of the terminal device A 102 and the terminal device B 103 in Embodiment 3.

FIG. 23 is a function block diagram showing the functional configuration of the terminal device A 102 and the terminal device B 103 in Embodiment 3. The terminal device 901 shown in FIG. 23 includes a significance level calculation part 914 in addition to the functions included in the terminal device 901 shown in FIG. 9.

The significance level calculation part 914 determines the significance level of the transmission data based on with whom communication is being performed or a communication record with this person.

Figure 24:
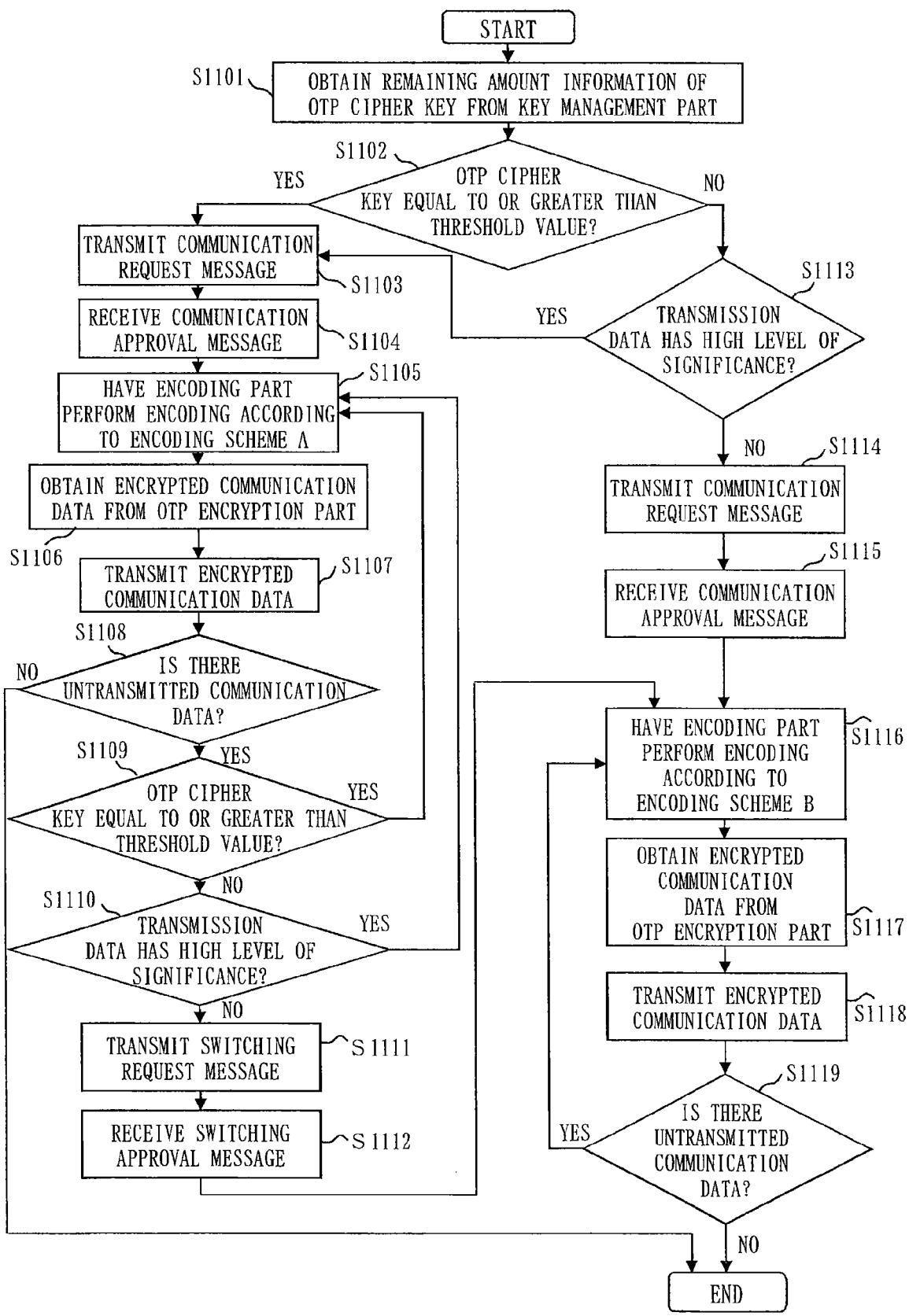
[FIG. 24] is a flowchart showing the process flow of the transmission control part 903 of the terminal device 901 in Embodiment 3.

FIG. 24 is a flowchart showing the process flow of the transmission control part 903 of the terminal device 901 in Embodiment 3.

The transmission control part 903 obtains from the key management part 905 the remaining amount information indicating whether the remaining amount of the OTP cipher key is running low (S1101). If the remaining amount of the OTP cipher key is equal to or greater than the threshold value (YES in S1102), the transmission control part 903 advances to the process of S1103. If the remaining amount is less than the threshold value (NO in S1102), the transmission control part 903 advances to the process of S1113 (S1102).

The process from S1103 through S1112 will be described. The process from S1103 through S1109 is substantially the same as the process from S303 through 5309 shown in FIG. 10 and thus will not be described. If the remaining amount of the OTP cipher key is less than the threshold value (NO in S1109), the transmission control part 903 determines whether the significance level of the transmission data obtained from the significance level calculation part 914 is high (S1110). If the significance level is high (YES in S1110), the transmission control part 903 returns to the process of S1105 and continues with encoding according to the encoding scheme A. On the other hand, if the significance level is low (NO in S1110), the transmission control part 903 advances to the process of S1111 and switches the encoding scheme to the encoding scheme B. The process from S1111 through S1112 is substantially the same as the process from S310 through 5311 shown in FIG. 9 and thus will not be described.

The process of S1113 and subsequent steps will be described. The transmission control part 903 determines whether the significance level of the transmission data obtained from the significance level calculation part 914 is high (S1113). If the significance level is high (YES in S1113), the transmission control part 903 advances to the process of S1103, and determines that the encoding scheme A is to be employed. On the other hand, if the significance level is low (NO in S1113), the transmission control part 903 advances to the process of S1114, and determines that the encoding scheme B is to be employed. The process from S1114 through S1119 is substantially the same as the process from S312 through S317 shown in FIG. 10 and thus will not be described.

The process of the terminal device B 103 which is the reception-side terminal device will now be described in detail.

Figure 25:
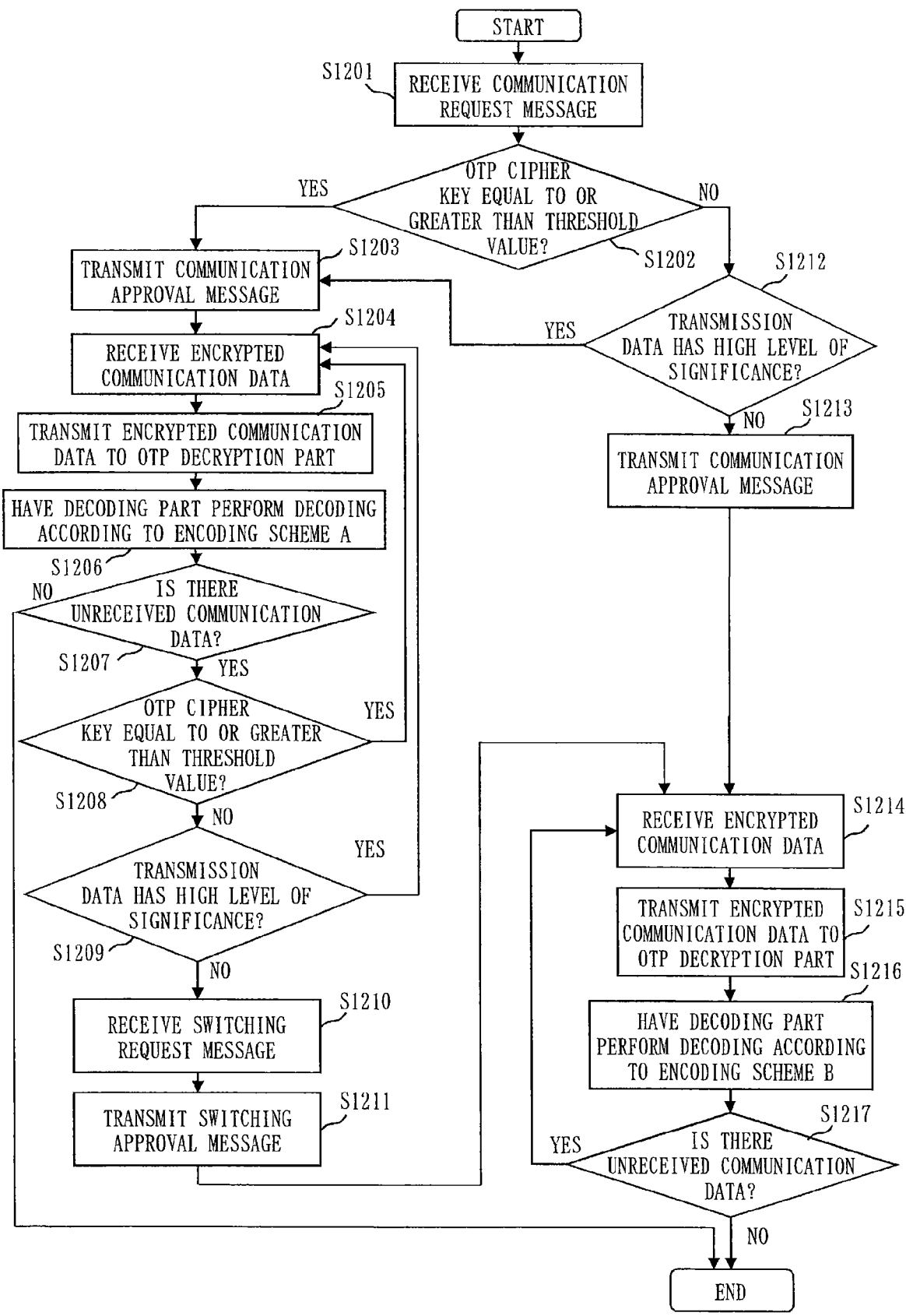
[FIG. 25] is a flowchart showing the process flow of the reception control part 904 of the terminal device 901 in Embodiment 3.

FIG. 25 is a flowchart showing the process flow of the reception control part 904 of the terminal device 901 in Embodiment 3.

The reception control part 904 receives the communication request message from the terminal device A 102 via the communication interface 902 (S1201). The reception control part 904 checks the remaining amount of the OTP cipher key. If the remaining amount is equal to or greater than the threshold value, the reception control part 904 advances to the process of S1203. If the remaining amount is less than the threshold value, the reception control part 904 advances to the process of S1212 (S1202).

The process from S1203 through S1211 will be described. The process from S1203 through S1208 is substantially the same as the process from S403 through 5408 shown in FIG. 11 and thus will not be described. If the remaining amount of the OTP cipher key is less than the threshold value (NO in S1208), the reception control part 904 determines whether the significance level of the transmission data obtained from the significance level calculation part 914 is high (S1209). If the significance level is high (YES in S1209), the reception control part 904 returns to the process of S1204 and continues with encoding according to the encoding scheme A. On the other hand, if the significance level is low (NO in S1209), the reception control part 904 advances to the process of S1210 and switches the encoding scheme to the encoding scheme B. The process from S1210 through S1211 is substantially the same as the process from S409 through S410 shown in FIG. 11 and thus will not be described.

The process of S1212 and subsequent steps will be described. The reception control part 904 determines whether the significance level of the transmission data obtained from the significance level calculation part 914 is high (S1212). If the significance level is high (YES in S1212), the reception control part 904 advances to the process of S1203 and determines that the encoding scheme A is to be employed. On the other hand, if the significance level is low (NO in S1212), the reception control part 904 advances to the process of S1213 and determines that the encoding scheme B is to be employed.

The process from S1213 through S1217 is substantially the same as the process from S411 through 5415 shown in FIG. 10 and thus will not be described.

As described above, in the encryption system 1 according to Embodiment 3, the significance level of the transmission data for cipher communication is determined based on with whom communication is being performed, a communication record with this person, or the like, and the encoding scheme is switched based on the determined significance level. Therefore, when significant voice data is transmitted, deterioration of voice quality due to the encoding scheme having the lower bit rate can be prevented.

In the above description, when significant transmission data is transmitted, the encoding scheme having the higher bit rate is employed regardless of the remaining amount of the OTP cipher key. Based on the same idea, when transmission data of low significance is transmitted, the encoding scheme having the lower bit rate may be employed regardless of the remaining amount of the OTP cipher key. In this case, it may be arranged that if the remaining amount of the OTP cipher key is equal to or greater than the threshold value, then the significance level of the transmission data is determined to switch the encoding scheme.

Alternatively, the threshold value for determining whether to employ the encoding scheme A or B may be changed depending on the significance level of the transmission data. That is, it may be arranged that the higher the significance level of the transmission data, the smaller the number of bits indicated by the threshold value, and the lower the significance level of the transmission data, the greater the number of bits indicated by the threshold value.

The above description is based on the premise that the significance level is the same for a series of transmission data to be transmitted in one communication (from the start to end of communication), and the significance level of the transmission data is determined only once in one communication. However, the data to be transmitted in one communication may include data having different significance levels. In this case, the significance level may be determined for each unit data amount of the transmission data to decide which encoding scheme is to be employed.

Embodiment 4

In Embodiment 3, the encoding scheme is switched depending on the significance level determined by the significance level calculation part 914. Embodiment 4 will describe a specific method with which the significance level calculation part 914 determines the significance level.

FIG. 26 is a diagram showing a specific example of how the significance level is determined.

The significance level calculation part 914 determines the significance level of the transmission data based on the quality of voice included in the transmission data and the state of communication.

For example, the significance level calculation part 914 determines that the significance level of the transmission data is high if the volume of the voice is low, and determines that the significance level of the transmission data is low if the volume of the voice is high. Alternatively, the significance level calculation part 914 determines that the significance level of the transmission data is high if the volume of the voice becomes lower than the normal volume. This is because an important matter that needs to be kept secret is likely to be discussed in a low voice.

Further, the significance level calculation part 914 determines that the significance level of the transmission data is high if there are large changes in intonation, and determines that the significance level of the transmission data is low if there are small changes in intonation. This is because large changes in intonation are likely to occur while an important matter is being discussed.

The significance level calculation part 914 determines the significance level of the transmission data depending on with whom communication is being performed (destination of the transmission data). For example, the significance level calculation part 914 determines that the significance level of the transmission data is high if the communication is with a business acquaintance or a supervisor, determines that the significance level of the transmission data is average if the communication is with a colleague or a friend, and determines that the significance level of the transmission data is low if the communication is with a stranger. This is because it is likely that the more significant (closer) the person in communication with, the more significant the matter being discussed. The attributes of persons with whom communication is performed (business acquaintance, supervisor, colleague, friend, stranger) may be preregistered in the terminal device by the user and, at the start of communication, the terminal device may read the registered attribute of a person with whom the communication is to be started. For example, when the terminal device is a cellular phone or the like, the attributes of registered persons may be registered in an address book.

The significance level calculation part 914 determines that the significance level of the transmission data is high if there is no communication record recently (within a predetermined past period), and determines that the significance level of the transmission data is low if there is a recent communication record. This is because it is likely that an important matter is discussed with a person with whom communication is not performed frequently. The voice of a person with whom communication is not performed frequently may be difficult to understand and thus the higher bit rate is desirable.

The significance level calculation part 914 may determine the significance level of the transmission data based on a combination of a plurality of evaluation items such as the volume of voice, changes in intonation, the person with whom communication is being performed, and the communication record. Alternatively, even when the significance level of the transmission data is determined based on a combination of a plurality of evaluation items, the significance level of the transmission data may exceptionally be determined based on one of the evaluation items, such that the significance level is always high (the higher bit rate is always used) if the communication is with a specific person, for example.

Embodiment 5

In Embodiment 3, the encoding scheme is switched based on the significance level determined by the significance level calculation part 914. However, even if a low level of significance is determined by the significance level calculation part 914, a significant communication may temporarily take place. In this case, it is necessary to allow the user to switch the encoding scheme at will.

Accordingly, in Embodiment 5, it will be described that the encoding scheme is switched when the user presses a switch (input device) provided in the terminal device.

First, in Embodiment 5, the process of a case will be described where when the remaining amount of the OTP cipher key falls below the predetermined threshold value, the encoding scheme is switched to the encoding scheme having the lower bit rate only if the significance level is determined as low.

Figure 27:
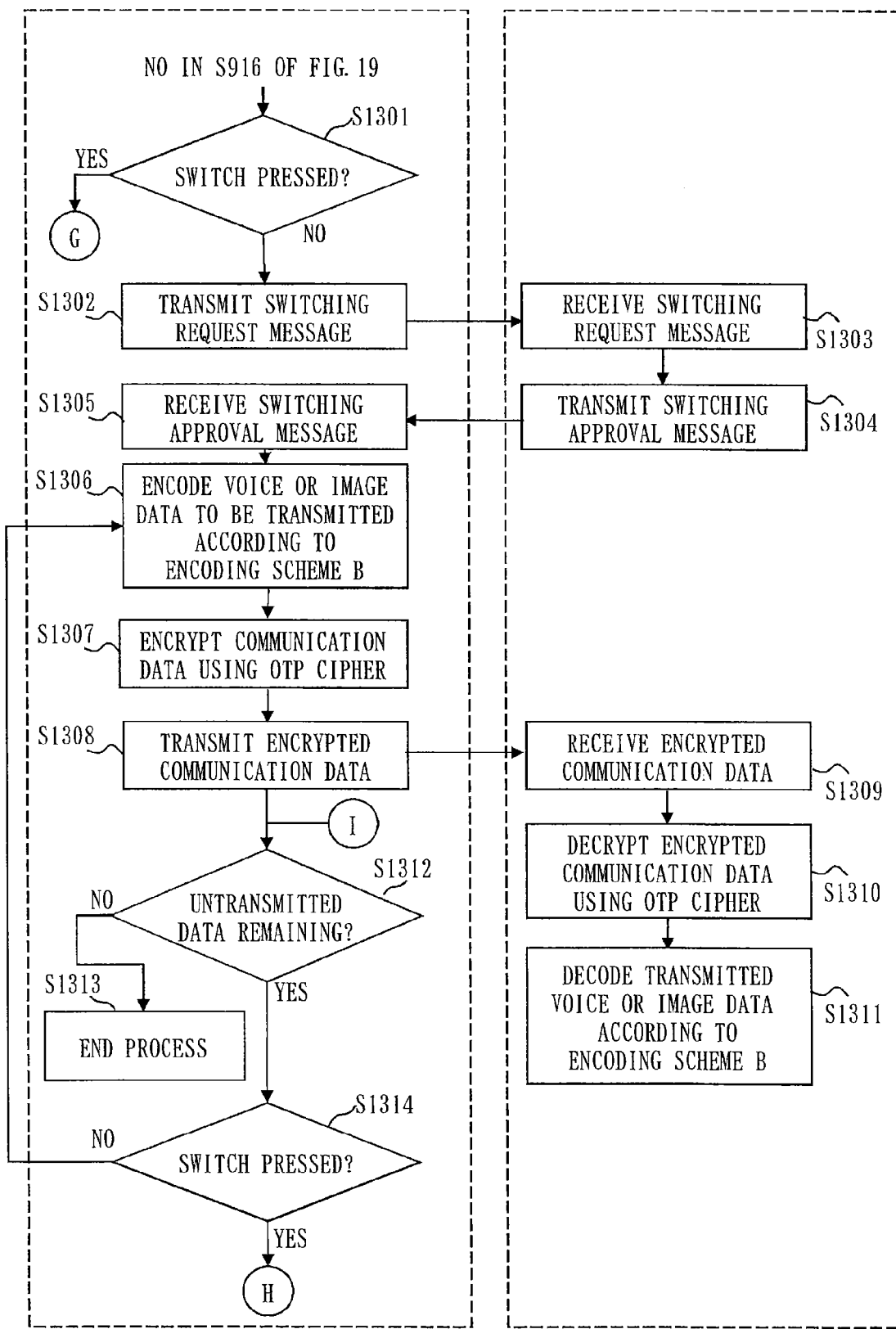
[FIG. 27] is a flowchart showing the flow of the communication process of FIG. 4 in Embodiment 5.
Figure 28:
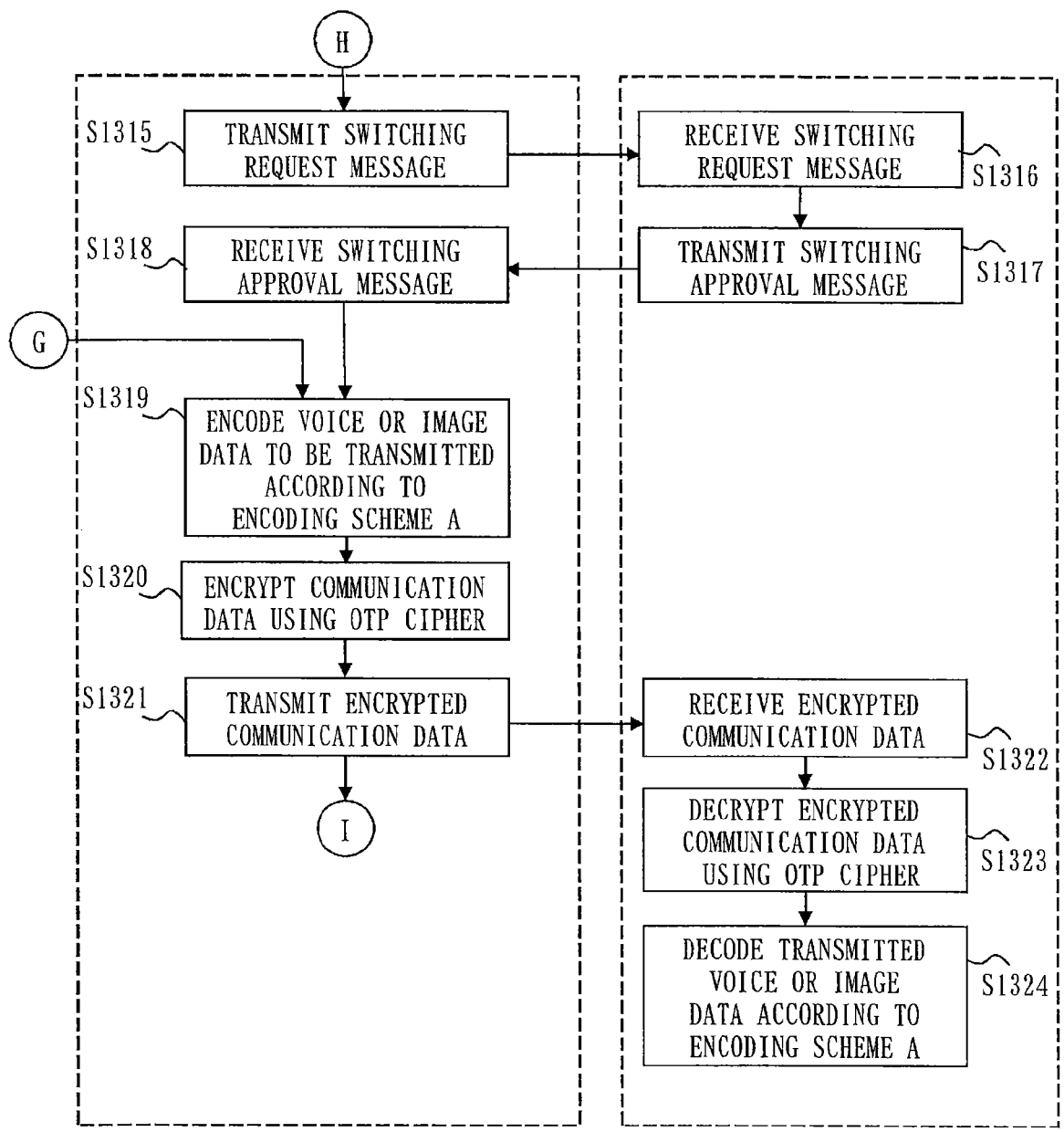
[FIG. 28] is a flowchart showing the flow of the communication process of FIG. 4 in Embodiment 5.

FIGS. 27 and 28 are flowcharts showing the flow of the communication process of FIG. 4 in Embodiment 5. FIGS. 27 and 28 show only portions of the process if NO is selected in S916 of FIG. 19. Other portions of the process are substantially the same as those shown in FIGS. 19 and 20. In the process shown in FIGS. 27 and 28, the encoding scheme is switched back to the encoding scheme having the higher bit rate only when the user presses the switch.

The terminal device A 102 checks whether the switch has been pressed by the user (S1301). If the switch has not been pressed (NO in S1301), the terminal device A 102 advances to the process of S1302. On the other hand, if the switch has been pressed (YES in S1301), the terminal device A 102 advances to the process of S1319.

The terminal device A 102 transmits to the terminal device B 103 the switching request message 406 indicating that the encoding scheme is to be switched to the encoding scheme B, and informs the terminal device B 103 of switching of the encoding scheme (S1302 through S1305). Then, the terminal device A 102 performs encoding according to the encoding scheme B (S1306 through S1311). The process from S1306 through S1311 is substantially the same as the process from S120 through S125 shown in FIG. 6 and thus will not be described.

After transmitting the encrypted communication data in S1308, the terminal device A 102 checks whether there is untransmitted voice or image data (S1312). If there is no untransmitted voice or image data (NO in S1312), the terminal device A 102 ends the process (S1313). On the other hand, if there is untransmitted voice or image data (YES in S1312), the terminal device A 102 determines whether the switch has been pressed by the user (S1314). If the switch has not been pressed (NO in S1314), the terminal device A 102 returns to the process of S1306. If the switch has been pressed (YES in S1314), the terminal device A 102 advances to the process of S1315.

The terminal device A 102 transmits to the terminal device B 103 the switching request message 406 indicating that the encoding scheme is to be switched to the encoding scheme A, and informs the terminal device B 103 of switching of the encoding scheme (S1315 through S1318). Then, the terminal device A 102 performs encoding according to the encoding scheme A (S1319 through S1324). The process from S1319 through S1324 is substantially the same as the process from S107 through S112 shown in FIG. 5 and thus will not be described. After transmitting the encrypted communication data in S1321, the terminal device A 102 returns to the process of S1312 and checks whether there is untransmitted voice or image data.

Next, in Embodiment 5, the process when the remaining amount of the OTP cipher key is less than the predetermined threshold value at the start of communication is substantially the same as the process shown in FIGS. 27 and 28. In this case, if NO is selected in S1002 of FIG. 21, the process proceeds to S1031 of FIG. 27 and the process from S1301 through S1324 is executed.

The functions of the terminal device A 102 and the terminal device B 103 in Embodiment 5 will now be described.

Figure 29:
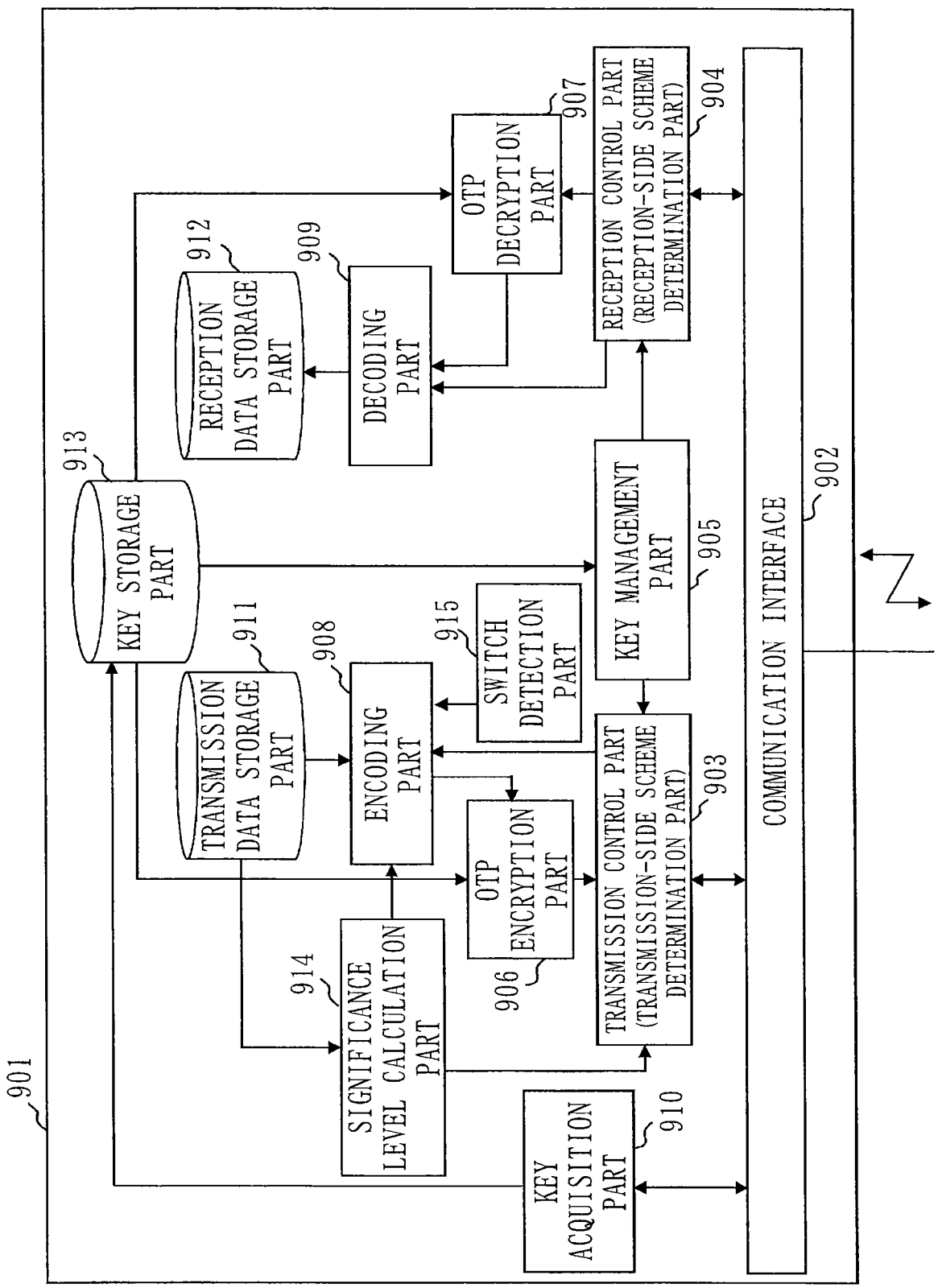
[FIG. 29] is a function block diagram showing the functional configuration of the terminal device A 102 and the terminal device B 103 in Embodiment 5.

FIG. 29 is a function block diagram showing the functional configuration of the terminal device A 102 and the terminal device B 103 in Embodiment 5. The terminal device 901 shown in FIG. 29 includes a switch detection part 915 in addition to the functions included in the terminal device 901 shown in FIG. 23.

The switch detection part 915 detects pressing of the switch by the user.

As described above, in the encryption system 1 according to Embodiment 5, the encoding scheme is switched not only based on the significance level determined by determining the significance level of the communication data for cipher communication according to the person with whom communication is being performed or the communication record with this person, but also by detection of pressing of the switch provided in the terminal device 901.

In the above description, even if the remaining amount of the OTP cipher key is less than the threshold value, the encoding scheme having the higher bit rate is employed while the switch is pressed. Alternatively, based on the same idea, even if the remaining amount of the OTP cipher key is equal to or greater than the threshold value, the encoding scheme having the lower bit rate may be employed while the switch is pressed.

Embodiment 6

Normally, an unused OTP cipher key is stored in a non-volatile memory or the like. In Embodiment 6, the OTP cipher key is loaded into a volatile memory such as a RAM immediately before being used, and the OTP cipher key is erased from the non-volatile memory. This prevents the OTP cipher key that has been used from being extracted by way of an illegal power shutdown or the like.

Normally, the OTP cipher key needs to be retained in the device even when the device is powered off. For this reason, the unused OTP cipher key is stored in a non-volatile storage device such as an HDD.

In Embodiment 6, in order to prevent encrypted communication data from being decrypted by a fraudulent person, after encryption or decryption by the OTP cipher key is completed, the OTP cipher key is erased and the same OTP cipher key will not be used again in the same device.

However, if the device is powered off after an encryption or decryption process is started but before being completed, a process of erasing the OTP cipher key may not be performed properly. In this case in particular, a situation may occur where the encrypted communication data has passed through the communication channel and the OTP cipher key is left in the device. In this situation, there is a risk that the OTP cipher key may be illegally extracted from the device and the encrypted communication data may be decrypted.

Figure 30:
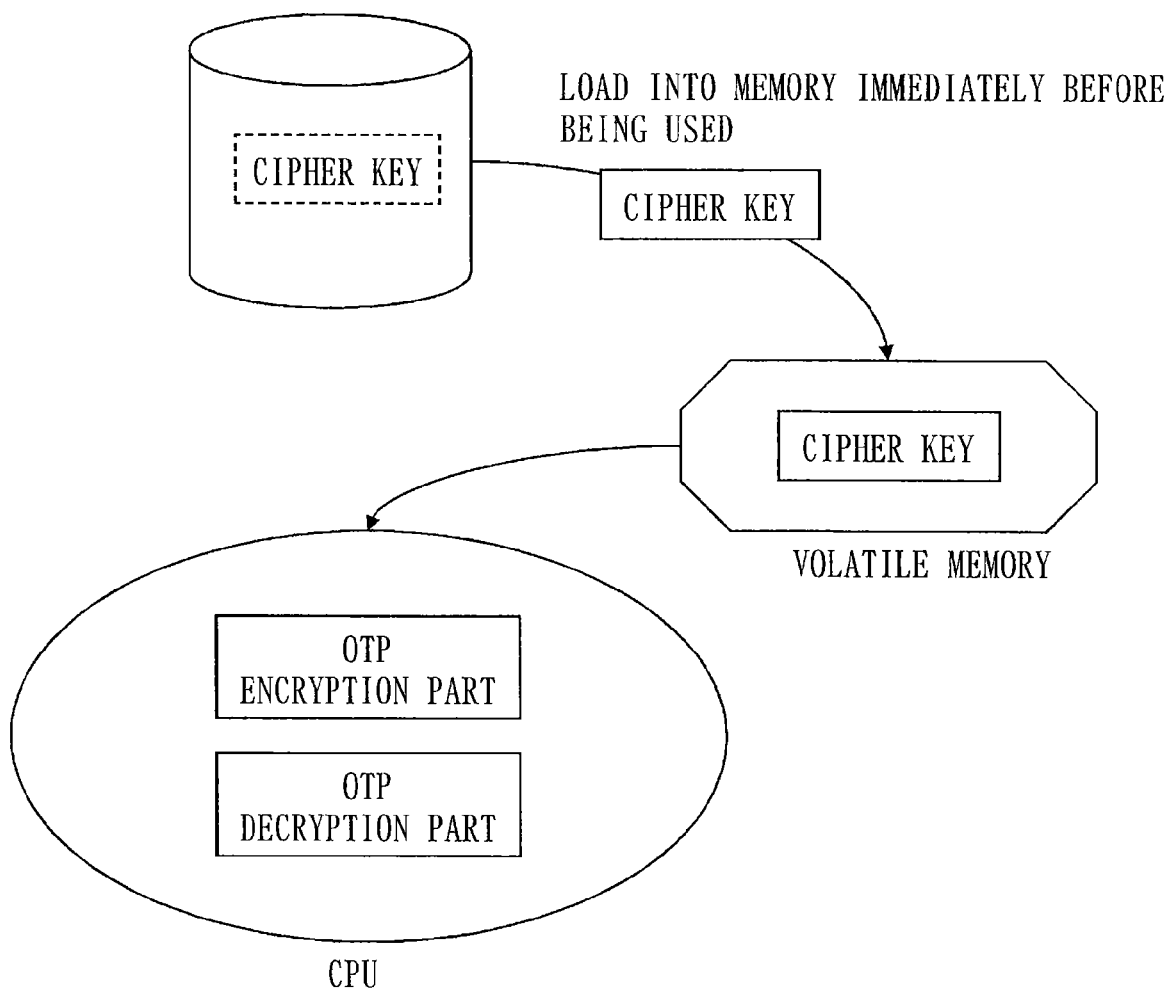
[FIG. 30] is a diagram for explaining the operation of the terminal device in Embodiment 6.

FIG. 30 is a diagram for explaining the operation of the terminal device in Embodiment 6.

As shown in FIG. 30, the OTP cipher key when unused is stored in a non-volatile memory such as an HDD, and the terminal device loads the OTP cipher key into a volatile memory immediately before being used, and erases the OTP cipher key in the HDD or non-volatile memory. With this arrangement, the OTP cipher key is not left in the device even if the device is powered off. Thus, the OTP cipher key is not exposed by being illegally extracted, and there is no risk of the encrypted communication data being decrypted.

For example, the key storage part 913 is a non-volatile storage device such as an HDD.

Upon receiving an instruction for encryption or decryption from the transmission control part 903 or the reception control part 904, the OTP encryption part 906 or the OTP decryption part 907 obtains the OTP cipher key from the key storage part 913. The OTP encryption part 906 or the OTP decryption part 907 stores the obtained OTP cipher key in a volatile storage device such as a RAM (Random Access Memory) and erases the obtained OTP cipher key from the key storage part 913. Then, the OTP encryption part 906 or the OTP decryption part 907 performs encryption or decryption using the OTP cipher key stored in the volatile storage device.

Embodiment 7

In Embodiment 7, the description will be directed to notification of the remaining amount of the OTP cipher key, notification of the encoding scheme currently being used for cipher communication, and notification of switching of the encoding scheme. This allows the user of the terminal device to intuitively know the current status of the encoding scheme and the cipher key.

Normally, the OTP cipher key is held in the terminal device. Thus, it is not easy for the user to know information on the OTP cipher key. It is not also easy for the user to know switching of the encoding scheme due to a shortage of the OTP cipher key.

Switching of the encoding scheme means, for example, that the voice or image quality changes. The remaining amount of the OTP cipher key gives an indication of a period of time before the encoding scheme is switched. Thus, it is important that the user can know these pieces of information. Accordingly, in Embodiment 7, during cipher communication, the current status of the remaining amount of the OTP cipher key and the encoding scheme is notified to the user by on-screen display, sound, and vibration of the terminal.

First, the functions of the terminal device A 102 and the terminal device B 103 in Embodiment 7 will be described.

Figure 31:
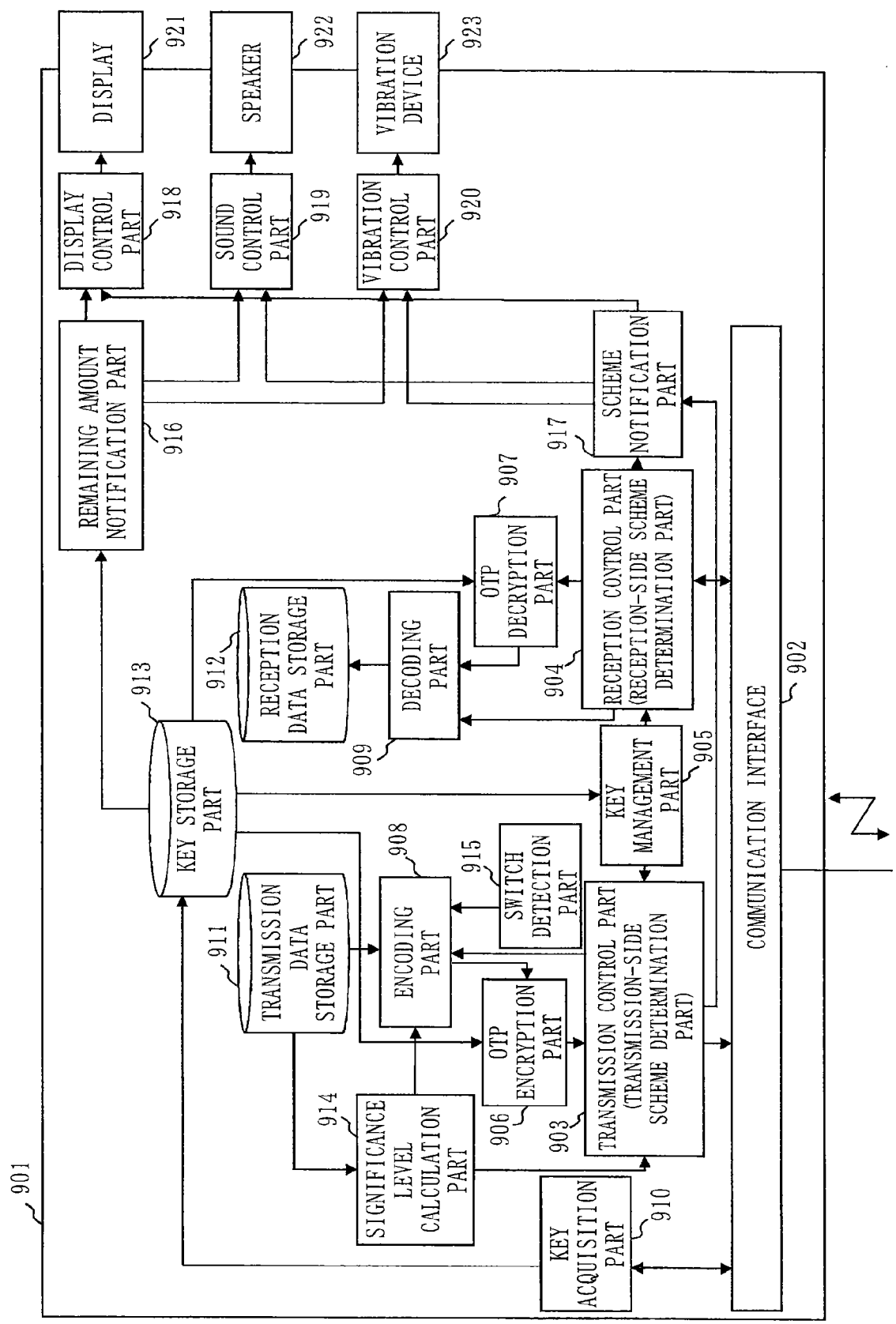
[FIG. 31] is a function block diagram showing the functional configuration of the terminal device A 102 and the terminal device B 103 in Embodiment 7.

FIG. 31 is a function block diagram showing the functional configuration of the terminal device A 102 and the terminal device B 103 in Embodiment 7. The terminal device 901 shown in FIG. 31 includes a remaining amount notification part 916, a scheme notification part 917, a display control part 918, a sound control part 919, a vibration control part 920, a display 921, a speaker 922, and a vibration device 923, in addition to the functions included in the terminal device 901 shown in FIG. 29.

The remaining amount notification part 916 obtains the remaining amount information of the OTP cipher key from the key storage part 913. Then, using the processing device, the remaining amount notification part 916 converts the obtained remaining amount information of the OTP cipher key into notification information for notifying the remaining amount of the OTP cipher key to the user, and transmits the notification information to the display control part 918, the sound control part 919, and the vibration control part 920.

The scheme notification part 917 obtains information indicating the encoding scheme currently being used from the transmission control part 903 and the reception control part 904. Then, the scheme notification part 917 converts the obtained information indicating the encoding scheme into information for notifying the encoding scheme to the user, and transmits the information to the display control part 918, the sound control part 919, and the vibration control part 920. When the encoding scheme is switched, the scheme notification part 917 transmits information indicating switching of the encoding scheme to the display control part 918, the sound control part 919, and the vibration control part 920.

Based on the information received from the remaining amount notification part 916 and the scheme notification part 917, the display control part 918 issues an instruction for screen display to the display 921.

Based on the information received from the remaining amount notification part 916 and the scheme notification part 917, the sound control part 919 issues an instruction for sound output to the speaker 922.

Based on the information received from the remaining amount notification part 916 and the scheme notification part 917, the vibration control part 920 issues an instruction for making the terminal vibrate to the vibration device 923.

The display 921 is a device that can display pictures and text on a screen such as a liquid crystal display.

The speaker 922 is a device that can output sound.

The vibration device 923 is a device that can make the terminal vibrate.

For example, the remaining amount notification part 916 always has the remaining amount of the OTP cipher key displayed on the display 921 using a numerical value or the like. When the encoding scheme is switched, the scheme notification part 917 arranges for information thereof to be displayed on the display 921, for sound to be output from the speaker 921, and for the vibration device 923 to vibrate.

For example, every time the encoding scheme is switched, the color of information displayed on the display 921, the text, symbol, or picture displayed on the display 921, the type of sound, the duration of sound, the type of vibration, or the interval of vibration may be changed depending on the encoding scheme to be employed.

The remaining amount notification part 916 and the scheme notification part 917 may be configured to notify the user that the encoding scheme is about to be switched before the encoding scheme is switched and the voice or image quality changes. This makes it possible, for example, to prompt the user to obtain the OTP cipher key from the key sharing device.

Embodiment 8

Embodiment 8 will describe a method of realizing cipher communication in the embodiments described above.

The communication process in Embodiments 1 to 7 before cipher communication takes place can be realized by SIP (Session Initiation Protocol).

More specifically, in accordance with the SIP sequence, the communication request message is produced as an INVITE message, and information on the cipher key or the like is described using SDP (Session Description Protocol). The communication approval message is produced as a reply message indicating 200 OK, and information on the cipher key or the like is described using the SDP, as with the INVITE message. The communication refusal message is produced as a reply message indicating 488 Not Acceptable.

Cipher communication, switching of the encoding scheme during cipher communication, and the like can be realized using SRTP (Secure Real-Time Protocol).

More specifically, the encoding scheme to begin with is determined by a negotiation according to the SIP, and cipher communication and switching of the encoding scheme can be implemented by communication according to the SRTP.

The hardware configuration of the terminal device 901 in the above embodiments will be described.

Figure 32:
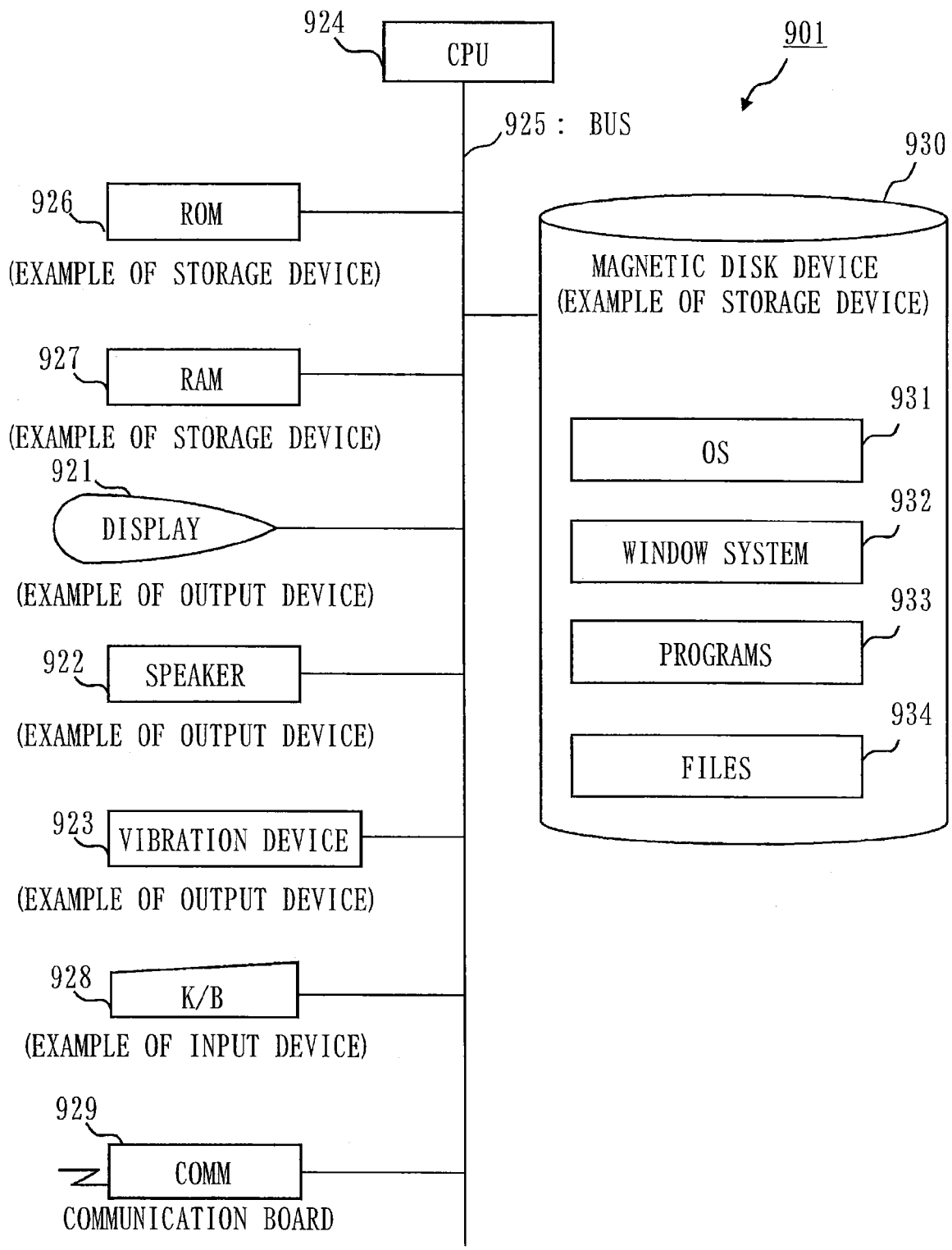
[FIG. 32] is a diagram showing an example of the hardware configuration of the terminal device 901.

FIG. 32 is a diagram showing an example of the hardware configuration of the terminal device 901.

As shown in FIG. 32, the terminal device 901 includes a CPU 924 (also referred to as Central Processing Unit, central processing device, processing device, computation device, microprocessor, microcomputer, or processor) that executes programs. The CPU 924 is connected via a bus 925 to the ROM 926, the RAM 927, the display 921, the speaker 922, the vibration device 923, a keyboard 928 (K/B), a communication board 929 (an example of the communication interface 902), and the magnetic disk device 930 (an HDD or fixed disk device), and controls these hardware devices. In place of the magnetic disk device 930, a storage device such as an optical disk device or a memory card read/write device may be used. The magnetic disk device 930 is connected via a predetermined fixed disk interface.

The magnetic disk device 930, the ROM 926, or the like stores an operating system 931 (OS), a window system 932, programs 933, and files 934. The programs 933 are executed by the CPU 924, the operating system 931, or the window system 932.

The programs 933 include software and programs that execute the functions described as the "transmission control part 903", the "reception control part 904", the "key management part 905", the "OTP encryption part 906", the "OTP decryption part 907", the "encoding part 908", the "decoding part 909", the "key acquisition part 910", the "significance level calculation part 914", the "switch detection part 915", the "remaining amount notification part 916", the "scheme notification part 917", the "display control part 918", the "sound control part 919", the "vibration control part 920", and so on in the above description, as well as other programs. The programs are read and executed by the CPU 924.

The files 934 store, as entries of a "database", information, data, signal values, variable values, and parameters to be stored in the "transmission data storage part 911", the "reception data storage part 912", and the "key storage part 913" in the above description. The "database" is stored in a recording medium such as a disk or a memory. The information, data, signal values, variable values, and parameters stored in the recording medium such as the disk or the memory are read out to a main memory or a cache memory by the CPU 924 through a read/write circuit, and are used for operations of the CPU 924 such as extraction, search, reference, comparison, calculation, computation, processing, output, printing, and display. The information, data, signal values, variable values, and parameters are temporarily stored in the main memory, the cache memory, or a buffer memory during the operations of the CPU 924 including extraction, search, reference, comparison, calculation, computation, processing, output, printing, and display.

As with the terminal device 901, the key sharing device 1201 includes a CPU 924 that executes programs. The CPU 924 is connected, via a bus 925, to a ROM 926, a RAM 927, a keyword 928 (KB), a communication board 929 (an example of the communication interface 1202), and a magnetic disk device 930, and controls these hardware devices.

The magnetic disk device 930, the ROM 926, or the like stores an operating system 931 (OS), a window system 932, programs 933, and files 934. The programs 933 are executed by the CPU 924, the operating system 931, or the window system 932.

The programs 933 include software and programs that execute the functions described as the "key sharing part 1203", the "key transfer part 1204", and so on in the above description, as well as other programs.

The files 934 store, as entries of a "database", information, data, signal values, variable values, and parameters to be stored in the "key storage part 1205" in the above description.

The arrows in the flowcharts in the above description mainly represent inputs/outputs of data and signals. The data and signal values are stored in the memory of the RAM 927, a recording medium such as an optical disk, or an IC chip. The data and signals are transmitted online via a transmission medium such as the bus 925, signal lines, cables, as well as electric wires.

A "part" in the above description may be a "circuit", "device", "equipment", "means", or "function", and may also be a "step", "procedure", or "process". A "device" may be a "circuit", "equipment", "means", or "function", and may also be a "step", "procedure", or "process". That is, a "part" may be realized by firmware stored in the ROM 926. Alternatively, a "part" may be implemented solely by software, or solely by hardware such as an element, a device, a substrate, or a wiring line, or a combination of software and hardware, or combination further including firmware. The firmware and software are stored, as programs, in a recording medium such as the ROM 926. The programs are read by the CPU 924 and executed by the CPU 924. That is, each program causes a computer or the like to function as a "part" described above.

Alternatively, each program causes the computer or the like to execute a procedure or a method of the "part" described above.

List Of Reference Signs

101: network, 102: terminal device A, 103: terminal device B, 104: key sharing device C, 105: key sharing device D, 106: network, 107: communication cable, 108: communication cable, 901: terminal device, 902: communication interface, 903: transmission control part, 904: reception control part, 905: key management part; 906: OTP encryption part, 907: OTP decryption part, 908: encoding part, 909: decoding part, 910: key acquisition part, 911: transmission data storage part, 912: reception data storage part, 913: key storage part, 914: significance level calculation part, 915: switch detection part, 916: remaining amount notification part, 917: scheme notification part, 918: display control part, 919: sound control part, 920: vibration control part, 921: display, 922: speaker, 923: vibration device, 924: CPU, 925: bus, 926: ROM, 927: RAM, 928: keyboard, 929: communication board, 930: magnetic disk device, 931: operating system, 932: window system, 933: programs, 934: files, 1201: key sharing device, 1202: communication interface, 1203: key sharing part, 1204: key transfer part, 1205: key storage part

The invention claimed is:

1. An encryption device comprising:
a memory configured to store a cipher key composed of a plurality of bits and used in a one-time pad cipher; and
circuitry configured to
determine an encoding scheme with which transmission data is to be encoded from a first encoding scheme and a second encoding scheme having a lower bit rate than the first encoding scheme, based on a number of remaining bits of the cipher key stored by the memory;
encode the transmission data according to the determined encoding scheme to generate encoded data; and
encrypt the encoded data with the one-time pad cipher using the cipher key stored in the memory to generate encrypted data, wherein
while the circuitry encodes the transmission data according to the second encoding scheme, if the number of the remaining bits of the cipher key stored by the memory rises to or above a predetermined number of bits, the circuitry switches the encoding scheme to encode the transmission data according to the first encoding scheme.

2. The encryption device according to claim 1, wherein while the circuitry encodes the transmission data according to the first encoding scheme, if the number of the remaining bits of the cipher key stored by the memory falls below the predetermined number of bits, the circuitry switches the encoding scheme to encode the transmission data according to the second encoding scheme.

3. The encryption device according to claim 1, wherein the circuitry encodes the transmission data according to the first encoding scheme if the number of the remaining bits of the cipher key stored by the memory is equal to or greater than the predetermined number of bits at start of communication, and the circuitry encodes the transmission data according to the second encoding scheme if the number of the remaining bits of the cipher key stored by the memory at the start of communication is less than the predetermined number of bits.

4. The encryption device according to claim 1, wherein the circuitry determines whether to encode the transmission data according to the first encoding scheme or the second encoding scheme, depending on a number of remaining bits of a one-time pad cipher key stored by a terminal to which the transmission data is to be transmitted.

5. The encryption device according to claim 1, wherein the circuitry determines whether to encode the transmission data according to the first encoding scheme or the second encoding scheme, depending on a significance level of the transmission data.

6. The encryption device according to claim 5, wherein when the significance level of the transmission data is high, the circuitry encodes the transmission data according to the first encoding scheme, regardless of the number of the remaining bits of the cipher key stored by the memory.

7. The encryption device according to claim 5, wherein the circuitry determines a number of bits to be used as a threshold value in accordance with the significance level of the transmission data, and determines whether to encode the transmission data according to the first encoding scheme or the second encoding scheme, depending on whether the number of the remaining bits of the cipher key stored by the memory is less than the number of bits determined as the threshold value.

8. The encryption device according to claim 5, wherein the circuitry determines the significance level of the transmission data in accordance with at least either of a terminal to which the transmission data is to be transmitted and a communication record with the terminal to which the transmission data is to be transmitted.

9. The encryption device according to claim 5, wherein the transmission data includes voice data; and
the circuitry determines the significance level of the transmission data in accordance with a change in the voice data.

10. The encryption device according to claim 1, wherein while a predetermined input is made by an input device, the circuitry encodes the transmission data according to the first encoding scheme, regardless of the number of the remaining bits of the cipher key stored by the memory.

11. The encryption device according to claim 1, wherein the memory is a non-volatile storage device that stores the cipher key; and
the circuitry is configured to copy the cipher key for the one-time pad cipher from the memory to a volatile storage device, erase from the memory the cipher key that has been copied, and then encrypt the encoded data using the cipher key copied to the volatile storage device.

12. The encryption device according to claim 1, further comprising:
a user interface configured to notify a user of switching of the encoding scheme when the circuitry switches the encoding scheme.

13. An encryption method comprising:
a scheme determination process, by a processing device, of determining an encoding scheme with which transmission data is to be encoded from a first encoding scheme and a second encoding scheme having a lower bit rate than the first encoding scheme, depending on a number of remaining bits of a cipher key stored in a storage device;
an encoding process, by the processing device, of encoding the transmission data according to the encoding scheme determined by the scheme determination process, thereby generating encoded data; and an encryption process, by the processing device, of encrypting with a one-time pad cipher using the cipher key stored in the storage device the encoded data generated by the encoding process, thereby generating encrypted data, wherein while the transmission data is encoded according to the second encoding scheme, if the number of the remaining bits of the cipher key stored by the storage device rises to or above a predetermined number of bits, the encoding process switches to encoding the transmission data according to the first encoding scheme.

14. A non-transitory computer readable medium including an encryption program that includes computer executable instructions that make a computer execute:

a scheme determination process of determining an encoding scheme with which transmission data is to be encoded from a first encoding scheme and a second encoding scheme having a lower bit rate than the first encoding scheme, depending on a number of remaining bits of a cipher key stored in a storage device;

an encoding process of encoding the transmission data according to the encoding scheme determined by the scheme determination process, thereby generating encoded data; and an encryption process of encrypting with a one-time pad cipher using the cipher key stored in the storage device the encoded data generated by the encoding process, thereby generating encrypted data, wherein while the transmission data is encoded according to the second encoding scheme, if the number of the remaining bits of the cipher key stored by the storage device rises to or above a predetermined number of bits, the encoding process switches to encoding the transmission data according to the first encoding scheme.

* * * * *